(12) United States Patent
Feng

(10) Patent No.: US 10,750,063 B2
(45) Date of Patent: Aug. 18, 2020

(54) SYSTEM AND METHOD FOR AN IMAGE FOCUSING ADJUSTMENT MODULE

(71) Applicant: Hand Held Products, Inc., Fort Mill, SC (US)

(72) Inventor: Chen Feng, Snohomish, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 110 days.

(21) Appl. No.: 16/040,101

(22) Filed: Jul. 19, 2018

(65) Prior Publication Data

US 2020/0028996 A1    Jan. 23, 2020

(51) Int. Cl.
*H04N 5/225* (2006.01)
*G02B 7/10* (2006.01)
*G02B 7/02* (2006.01)
*G03B 17/28* (2006.01)

(52) U.S. Cl.
CPC .......... *H04N 5/2253* (2013.01); *G02B 7/023* (2013.01); *G02B 7/102* (2013.01); *G03B 17/28* (2013.01); *H04N 5/2254* (2013.01); *H04N 5/2257* (2013.01)

(58) Field of Classification Search
CPC .. H04N 5/2253; H04N 5/2254; H04N 5/2257; G03B 17/28; G02B 7/023; G02B 7/102; G02B 7/08
See application file for complete search history.

(56) References Cited

U.S. PATENT DOCUMENTS

| | | | |
|---|---|---|---|
| 7,586,700 B2 | 9/2009 | Azegami et al. | |
| 2005/0190283 A1* | 9/2005 | Ish-Shalom | H04N 5/2254 348/340 |
| 2007/0009246 A1* | 1/2007 | Lee | G02B 7/04 396/72 |
| 2007/0077051 A1* | 4/2007 | Toor | H04N 5/2254 396/144 |
| 2008/0152339 A1* | 6/2008 | Westerweck | G03B 17/02 396/541 |
| 2008/0316350 A1* | 12/2008 | Gottwald | H04N 5/2257 348/340 |
| 2009/0021624 A1 | 1/2009 | Westerweck et al. | |
| 2009/0180021 A1* | 7/2009 | Kikuchi | H04N 5/2253 348/349 |
| 2013/0271856 A1 | 10/2013 | Rozitis | |
| 2015/0009400 A1* | 1/2015 | Shin | H04N 5/2254 348/373 |

* cited by examiner

*Primary Examiner* — Jason A Flohre
(74) *Attorney, Agent, or Firm* — Alston & Bird LLP

(57) ABSTRACT

Provided herein is an image focusing adjustment method, system, and module. A first image of a reference object is received in response to an input signal when the image focusing adjustment module is operating in a first state. The first image of the reference object is analyzed, based on which a plurality of adjustments to the image focusing adjustment module is controlled. The plurality of adjustments, performed by a plurality of actuators controlled by control module, include rotating a lens barrel assembly relative to a neck member along a first axis that causes a translational adjustment of the lens barrel assembly, rotating the neck member relative to a top member around the first axis that causes a rotational adjustment of the lens barrel assembly, and positioning a tilt adjustment member that causes tilt adjustment of the top member relative to a frame member along a second axis.

29 Claims, 16 Drawing Sheets

# SYSTEM AND METHOD FOR AN IMAGE FOCUSING ADJUSTMENT MODULE

TECHNOLOGICAL FIELD

Example embodiments of the present disclosure relate generally to image focusing adjustment, and, more particularly, to a system and method for image focusing adjustment module.

BACKGROUND

Generally, a compact camera module is implemented in various hand-held optical devices, such as an optical reader or a smartphone, including at least an imaging lens and an image sensor. The imaging lens having a fixed focal plane is assembled in a single barrel and mechanically adjusted in varying distances and directions. Once the imaging lens and the image sensor are suitably adjusted, the imaging lens focuses on an object and the image sensor generates an output image corresponding to the object in the field of view of the imaging lens.

Applicant has identified a number of deficiencies and problems associated with conventional precision focusing camera modules. Through applied effort, ingenuity, and innovation, many of these identified problems have been solved by developing solutions that are included in embodiments of the present disclosure, many examples of which are described in detail herein.

BRIEF SUMMARY

An image focusing adjustment method is disclosed herein. The image focusing adjustment method includes receiving, by an image processing module, a first image of a reference object in response to an input signal. The first image is captured by an imaging lens within a lens barrel assembly of an image focusing adjustment module that is operating in a first state. The method further includes analyzing, by the image processing module, the captured first image of the reference object. The method further includes controlling, by a control module coupled to the image processing module, a plurality of adjustments, through a plurality of actuators, to the image focusing adjustment module operating in the first state based on the analysis of the captured first image. The plurality of adjustments include rotating, by the plurality of actuators controlled by the control module, the lens barrel assembly relative to a neck member along a first axis that causes a translational adjustment of the lens barrel assembly, rotating, by the plurality of actuators controlled by the control module, a neck member relative to a top member around the first axis that causes a rotational adjustment of the lens barrel, and positioning, by the plurality of actuators controlled by the control module, a tilt adjustment member that causes tilt adjustment of the top member relative to a frame member along a second axis.

In an embodiment, the method includes communicating, by a feedback module coupled to the image processing module, a feedback signal to the control module based on an analysis of a second image that is generated by the imaging lens of the image focusing adjustment module operating in a second state. The image focusing adjustment module operates in the second state when the plurality of adjustments is performed on the image focusing adjustment module operating in the first state. The method further includes displaying, by a display module, the first image and/or the output image that is captured by the imaging lens in the lens barrel assembly of the image focusing adjustment module operating in the first state and/or the second state, respectively.

In various embodiments, the reference object is a monochrome or a colored test chart. The reference object includes specified patterns over a field of view (FOV) of the imaging lens. One or more image characteristics of the specified patterns in a plurality of zones in an image of the reference object captured by the imaging lens indicates an image quality of the image.

In an embodiment, the method further includes determining, by the image processing module, a plurality of zones in the first image of the reference object when the image focusing adjustment module is operating in the first state. The method further includes determining, by the image processing module, image characteristics of a pattern for each of the plurality of zones in the first image, and determining, by the image processing module, a first cumulative image characteristics of the pattern in the first image based on an average of the first image characteristics of the pattern for the plurality of zones.

The method further includes comparing, by the image processing module, the first cumulative image characteristics of the pattern in the first image for the plurality of zones with a threshold value. In an instance in which the first cumulative image characteristics of the pattern fails to satisfy the threshold value, the image processing module may be configured to send a first feedback signal to the image processing module for the adjustment of the image focusing adjustment module operating in the first state to operating in the second state. In another instance in which the first cumulative image characteristics of the pattern is satisfy the threshold value, the image processing module may be configured to send a final signal for designating the first state of the image focusing adjustment module as a final state.

The method further includes determining, by the image processing module, a focus of the imaging lens at a central zone of a plurality of zones. The focus of the imaging lens is adjusted based on a comparison of image characteristics of the pattern in the first image or the second image for the central zone of the plurality of zones with threshold values during the translational adjustment of the lens barrel assembly relative to the neck member along the first axis.

The method further includes determining, by the image processing module, one or more zones having corresponding image characteristics of the pattern failing to satisfy the threshold values. The one or more zones are reoriented along a third axis during the rotational adjustment of the neck member relative to the top member around the first axis, wherein the third axis is vertically orthogonal to the first axis.

The method further includes determining, by the image processing module, that the first image or the second image are balanced based on a mutual comparison of image characteristics of the pattern in the first image or the second image for a plurality of zones during the tilt adjustment of the top member relative to the frame member along the second axis.

In an embodiment, the method includes causing dispensing, by an adhesive dispensing module, a focusing locking adhesive between the lens barrel assembly and the neck member, a rotating locking adhesive between the neck member and the top member, and a tilting locking adhesive between the top member and the frame member. The method further includes curing, by an adhesive curing module, each of the focusing locking adhesive dispensed between the lens barrel assembly and the neck member, the rotating locking adhesive dispensed between the neck member and the top member, and the tilting locking adhesive dispensed between the top member and the frame member with ultraviolet (UV) light. In various embodiments, the input signal corresponds to an actuation of a hardware button press event, a software button press event, a provision of a voice command or a gesture input.

There is further disclosed an image focusing adjustment system including an image processing module communicatively coupled to a plurality of actuators, an image focusing adjustment module including an imaging lens in a lens barrel assembly of the image focusing adjustment module operating in a first state, wherein the imaging lens is configured to capture a first image of a reference object, and a control module, based on an analysis of the first image performed by the image processing module, configured to control a plurality of actuators. To adjust the image focusing adjustment module operating in the first state to operating in a second state, the plurality of actuators, controlled by the control module, is configured to rotate the lens barrel assembly relative to a neck member along a first axis that causes a translational adjustment of the lens barrel assembly, rotate a neck member relative to a top member around the first axis that causes a rotational adjustment of the lens barrel, and position a tilt adjustment member that causes tilt adjustment of the top member relative to a frame member along a second axis.

In an embodiment, the image focusing adjustment system includes a feedback module configured to communicate a feedback signal to the control module based on an analysis of a second image generated by the imaging lens of the image focusing adjustment module operating in the second state, wherein the image focusing adjustment module operates in the second state when the plurality of adjustments is performed on the image focusing adjustment module operating in the first state. A display module is configured to display the first image and/or the second image that is captured by the imaging lens in the lens barrel assembly of the image focusing adjustment module operating in the first state and/or the second state.

In an embodiment, for the analysis of the first image, the image processing module is configured to determine a plurality of zones in the first image of the reference object when the image focusing adjustment module is operating in the first state, determine a first image characteristics of the pattern for each of the plurality of zones in the first image, determine a first cumulative image characteristics of the pattern in the first image based on an average of the first image characteristics of the pattern for the plurality of zones, and compare the first cumulative image characteristics of the pattern in the first image for the plurality of zones with threshold values. In an instance in which the first cumulative image characteristics of the pattern fails to satisfy the threshold values, the image processing module may be configured to send a first feedback signal to a control module for the adjustment of the image focusing adjustment module operating in the first state to operating in the second state. In another instance in which the first cumulative image characteristics of the pattern satisfy the threshold values, the image processing module may be configured to send a final signal to the control system for designating the first state of the image focusing adjustment module as a final state.

In an embodiment, the image processing module is further configured to determine that a focus of the imaging lens at a central zone of a plurality of zones is adjusted based on a comparison of image characteristics of the pattern in the first image or the second image for a central zone of the plurality of zones with threshold values during the translational adjustment of the lens barrel assembly relative to the neck member along the first axis.

In an embodiment, the image processing module is further configured to determine that one or more zones having corresponding image characteristics of the pattern failing to satisfy the threshold values, wherein the one or more zones are reoriented along a third axis, during the rotational adjustment of the neck member relative to the top member around the first axis.

In an embodiment, the image processing module is further configured to determine that the first image or the second image is balanced based on comparison of one or more image characteristics of the pattern in the first image or the second image for a plurality of zones with threshold values during the tilt adjustment of the top member relative to the frame member along the second axis.

The image focusing adjustment system further includes an adhesive dispensing module configured to cause dispensing of a focusing locking adhesive between the lens barrel assembly and the neck member, a rotating locking adhesive between the neck member and the top member, and a tilting locking adhesive between the top member and the frame member. The image focusing adjustment system further includes the UV curing module configured to cure the dispensed focusing locking adhesive, the rotating locking adhesive, and the tilting locking adhesive once the lens barrel assembly is adjusted relative to the neck member, the neck member is adjusted relative to the top member, and the top member is adjusted relative to the frame member.

There is further disclosed an image focusing adjustment method including causing an imaging lens in a lens barrel assembly of an image focusing adjustment module operating in a current state to capture a first image of a reference object in response to an input signal, wherein the first image includes a plurality of zones, causing a display screen to display the captured first image, a current cumulative image characteristics of the pattern in the first image for the plurality of zones, and one or more boundaries enclosing one or more zones with current image characteristics of the pattern of the current image failing to satisfy threshold values, and causing a plurality of adjustments to the image focusing adjustment module operating in the current state such that the image focusing adjustment module is adjusted operating in the current state to operating in a next state for each of the one or more zones until the current image characteristics of the one or more zones in the current image satisfy the threshold values. The plurality of adjustments includes causing the lens barrel assembly to rotate relative to a neck member along a first axis for a translational adjustment of the lens barrel assembly, causing a neck member to rotate relative to a top member around the first axis for a rotational adjustment of the lens barrel, and causing a tilt adjustment member to position in the top member for a tilt adjustment of the top member relative to a frame member along a second axis.

In an embodiment, the causing of the plurality of adjustments is due to an external force imparted for providing one or more of the input signal and the plurality of adjustments. In an instance when the current image characteristics of the one or more zones satisfy a threshold value, the image focusing adjustment module is fixed in a final state by an adhesive dispensing module that causes dispensing of adhesive between the lens barrel and the neck member, the neck member and the top member, and the top member and the frame member. The dispensed adhesive between the lens barrel and the neck member, the neck member and the top member, and the top member and the frame member is cured with the UV light to secure the image focusing adjustment module operating in the final state.

There is further disclosed an image focusing adjustment method including an imaging lens disposed in a lens barrel assembly, a focusing holder member movably engaging the lens barrel assembly from a holder top end and securing an image sensor at a holder bottom end, the focusing holder member including, a neck member slidably engaged with the lens barrel assembly through fitting features that define a translational motion of the lens barrel assembly relative to the neck member along a first axis, wherein the first axis longitudinally coincides with an optical axis of the lens barrel assembly, a top member secured with the neck member through slide locking features that define a rotational motion of the neck member relative to the top member around the first axis, a frame member tiltably engaged with the top member through a second rotational friction fitting members located at a frame bottom end of the frame member, and a tilt adjustment member, positioned in the top member, that defines a tilting of the top member relative to the frame member along a second axis, wherein the second axis is orthogonally horizontal to the first axis.

In an embodiment, the top member tiltably engages with the frame member through at least one of a set of snap-in features and a first rotational friction fitting members, and a cover member of the top member is secured within the frame member through a set of snap-in features. The first axis corresponds to a roll axis and the second axis corresponds to a pitch axis.

The above summary is provided merely for purposes of summarizing some embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure according to one or more embodiments of the present disclosure are shown and described with respect to the figures presented herein, in which.

DETAILED DESCRIPTION

Figure 1A:
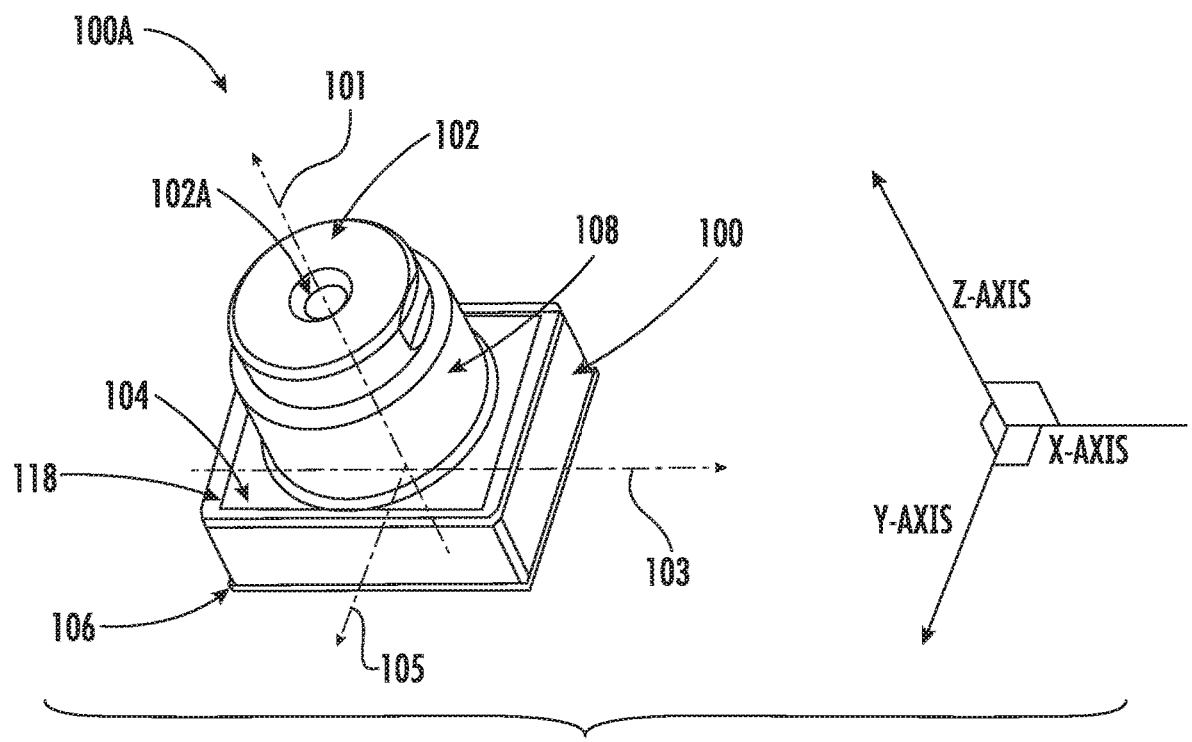
FIGS. 1A-1D illustrate various structural views of an image focusing adjustment module assembly, according to one or more embodiments of the present disclosure.
Figure 1B:
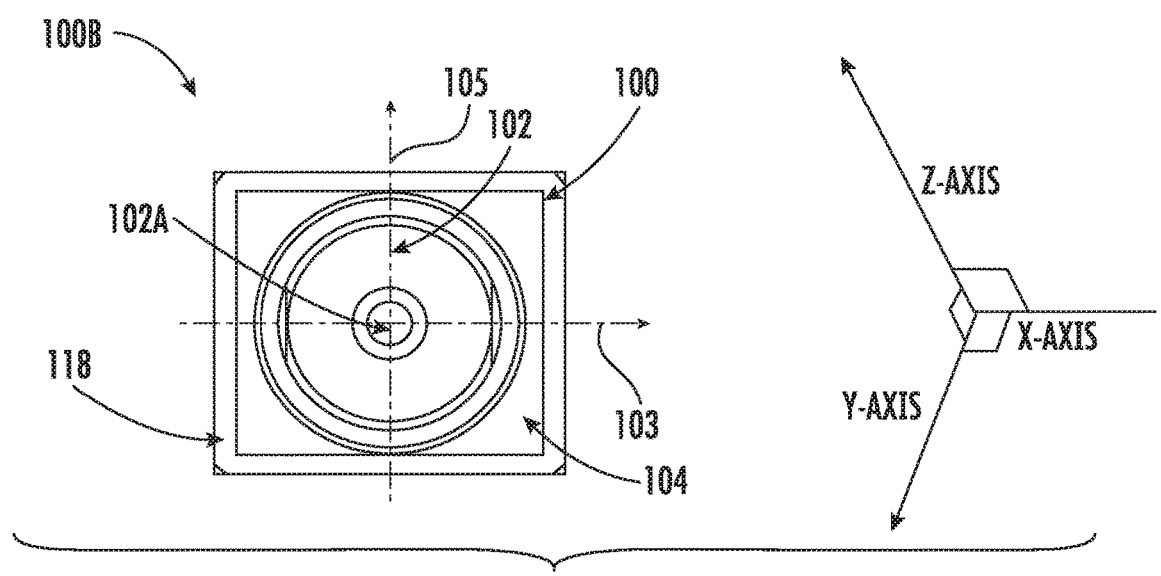
Figure 1C:
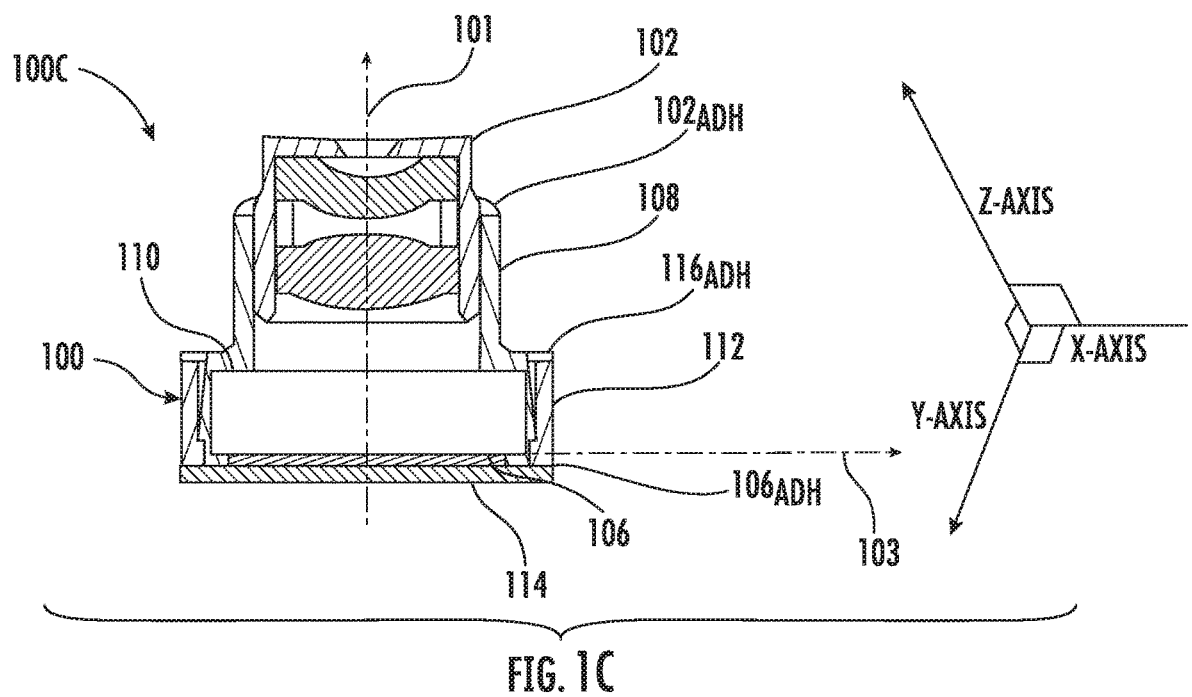

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "including" means including but not limited to, and should be interpreted in the manner it is typically used in the patent context. Use of broader terms such as includes, comprises, and having should be understood to provide support for narrower terms such as consisting of, consisting essentially of, and included substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The words "example" and "exemplary" are used herein to mean "serving as an example, instance, or illustration." Any implementation described herein as "exemplary" or "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in an embodiment, or it may be excluded.

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

Generally, a small compact camera module in various hand-held devices, such as an optical reader or a smartphone, includes an imaging lens and an image sensor. As the compact camera module becomes more sophisticated, it may experience various image focusing issues, such as image blurring, lower image resolution, and lower image contrast. Various examples of such image focusing issues may arise due to, for example, misalignment of the imaging lens as the imaging lens may not be exactly perpendicular to the sensor, misalignment of the image sensor board, or displacement caused by the shrinkage or expansion of the adhesive material used to fix various parts of the camera module. Such image focusing issues may be addressed by use of 5-axis or 6-axis active image focusing technique.

Typically, in high precision adjustment modules, a lens barrel assembly may be secured and pre-focused in a lens-holder and secured with lens adhesive. The lens-holder assembly may be placed on the top of thick adhesive layer on a camera board assembly. The lens-holder assembly may be then adjusted by the 6-axis active image focusing technique, based on X, Y, Z translations and X, Y, Z rotations, to achieve best focused image over the entire sensor area by monitoring the image during adjustment.

More specifically, the 6-axis active image focusing adjustment technique involves three high precision adjustments and three low precision adjustments. The high precision adjustments are: Z-axis translation, which is lens focusing and directly contributing to the lens blur, X-axis rotation, which is contributing to the blur along Y direction on the image, and Y-axis rotation, which is contributing to the blur along X direction on the image. On the contrary, the three low precision adjustment are: Z-axis rotation, which is nearly no contribution to the image quality as the lens is rotational symmetric, X-axis translation and Y-axis translation, both of which are contributing to corner image quality loss, however the design margin and assembly tolerance may eliminate such adjustment needs.

Alternatively or additionally, the lens-holder assembly may be adjusted by the 5-axis image focusing technique, based on X, Y, Z translations and X, Y rotations. The 5-axis active image focusing adjustment technique involves the same high precision and low precision adjustments, except for Z-axis rotation. By eliminating Z-axis rotation, which is nearly non-significant, the 6-axis active image focusing adjustment technique becomes the 5-axis active image focusing adjustment technique. Currently, most of the adjustment modules in practice use the 5-axis active image focusing adjustment technique.

Thus, such 6-axis and 5-axis active image focusing adjustment techniques involve six and five variable optimization processes, respectively, and require complicated and highly sophisticated precision equipment. Further, the thick adhesive layer thermal expansion or contraction mismatch may introduce application temperature problems. Curing thick layers of the adhesive also can introduce additional variations, errors, and make a final product with low accuracy and poor reliability. Consequently, the 6-axis and 5-axis active image focusing adjustment techniques are error prone, and at the same time involve very lengthy adjustment and curing processes, making such techniques economically unreasonable.

The image focusing adjustment module assembly, per the systems, apparatuses, and methods described herein, in some examples, implements a simple 3-axis precision focusing based on selective significant adjustments of the members of the image focusing adjustment module. As friction fitting is used instead of thick floating adhesive for fixing the adjusted members, the image focusing adjustment module assembly, per the systems, apparatuses, and methods described herein, in some examples, does not experience any adhesive curing shrinkage and thermal expansion.

FIGS. 1A-1D illustrate structural views 100A-100D of an image focusing adjustment module assembly 100, according to one or more embodiments of the present disclosure. As illustrated in FIGS. 1A-1D, in an example embodiment, a first perspective view 100A, a top view 100B, a side view 100C, and a second perspective view 100D, respectively, of the image focusing adjustment module assembly 100. In an embodiment, the image focusing adjustment module assembly 100 includes a lens barrel assembly 102, a focusing holder member 104, and an image sensor 106, as shown in at least FIGS. 1A and 1D. The focusing holder member 104 further includes a neck member 108, a top member 110 and a frame member 112, as shown in at least FIG. 1C. The image focusing adjustment module assembly 100 further includes an image sensor board assembly 114, a tilt adjustment member 116, and a cover member 118, as shown in at least FIG. 1D. There is further shown locking adhesives, depicted by $102_{Adh}$, $104_{Adh}$, $106_{Adh}$ and $116_{Adh}$, as shown in at least FIGS. 1C and 1D.

The lens barrel assembly 102 may include one or more imaging lenses, such as the imaging lens 102A, that focuses images of objects onto an active surface of an image sensor array of the image sensor 106. The imaging lens 102A may be, for example, a lens singlet, a lens doublet or a lens triplet. In an embodiment, the imaging lens 102A may be a fixed lens which may be combined with an electrically controllable active optical element, such as a tunable liquid crystal lens in the lens barrel assembly 102. In an embodiment, the imaging lens 102A may be a fixed lens which may be combined with other fixed lenses in the lens barrel assembly 102. In yet another embodiment, the imaging lens 102A may be the electrically controllable active optical element which may be combined with a fixed lens in the lens barrel assembly 102.

The lens barrel assembly 102 has a barrel top end and a barrel bottom end. The barrel top end of the lens barrel assembly 102 provides an aperture that collects light from an object placed in front of the barrel top end of the lens barrel assembly 102. The collected light may be focused by the imaging lens 102A on an outer portion of the lens barrel assembly 102. The focused light may be refocused by another tunable liquid crystal lens or another fixed imaging lens on an inner portion of the lens barrel assembly 102, and projected onto the image sensor 106.

In an example embodiment, the lens barrel assembly 102 may be cylindrical in shape and helically threaded along the curved outer surface. The helical threading may allow the bottom portion, of the lens barrel assembly 102, to be adjusted into a threaded cavity provided by the neck member 108 of the focusing holder member 104. In an alternative embodiment, the lens barrel assembly 102 may be friction fitted into the cavity provided by the neck member 108 of the focusing holder member 104.

The lens barrel assembly 102 is adjusted relative to the neck member 108 for a translational adjustment of the lens barrel assembly 102 along the first axis, i.e. the Z-Axis 101, which longitudinally coincides with the optical axis of the lens barrel assembly 102. In other words, the focusing of the imaging lens may be attained by rotating the lens barrel assembly 102 into or out of the neck member 108 of the focusing holder member 104 along the Z-Axis 101, as shown in FIG. 1A. In such an embodiment, the outer curved surface of the lens barrel assembly 102 may include three or more planar surfaces with the neck member 108 also having similar planar surfaces so that the lens barrel assembly 102 may be friction fitted into the cavity provided by the neck member 108 of similar shape. In an embodiment, the rotation of the lens barrel assembly 102 may be performed manually. In an embodiment, the rotation of the lens barrel assembly 102 may be performed via actuators, for example, the plurality of actuators 410 illustrated in FIG. 4, controlled by an image controller (as described in detail in FIG. 8).

The focusing holder member 104 may include one or more members, such as the neck member 108, the top member 110, and the frame member 112, configured to secure other members, such as the lens barrel assembly 102 and the image sensor 106 of the image focusing adjustment module assembly 100. The focusing holder member 104 has a holder top end and a holder bottom end. In an embodiment, the neck member 108 of the focusing holder member 104 engages with the lens barrel assembly 102 from the neck top end, along the Z-Axis 101, via one or more mechanisms. The focusing holder member 104 further secures the image sensor 106 disposed on the image sensor board assembly 114 from the holder bottom end.

The image sensor 106 may include an imaging surface that receives the light from the imaging lens 102A. In various embodiments, the image sensor 106 may include an array of charged coupled devices (CCDs), an array of complementary metal-oxide-semiconductor (CMOS) sensors, or other such conventional sensors for collecting light received from the imaging lens 102A. Such an array of sensors may be configured to generate the image data, in form of electrical signals, corresponding to the light received, corresponding to the object, from the imaging lens 102A.

The image sensor 106 may include an image sensor array including a plurality of pixels formed in a plurality of rows and a plurality of columns of pixels, a row circuitry, and a column circuitry. The image sensor array may be monochrome or color, and may have physical filters formed thereon in the form of standard RGB filter or other such color filters. In an embodiment, the image sensor array may be a one-dimensional or a two-dimensional image sensor array.

In an embodiment, a field of view (FOV) of the image focusing adjustment module assembly 100 is imaged by the image sensor 106. More particularly, light from the FOV passes through the lens barrel assembly 102 which focuses the light on the surface of the image sensor 106. An array of photo sensor cells in the image sensor 106 generate electronic signals corresponding to a two-dimensional array of pixel information for a target image, such as a reference object. For example, the image focusing adjustment module assembly 100 may employ a high sensitivity image sensor 106 array having a specific resolution, for example, 659×494 pixels.

The neck member 108 has a defined fitting of a specific hollow shape that movably engages the lens barrel assembly 102 along the Z-Axis 101. In an embodiment, the neck member 108 of the focusing holder member 104 may be of cylindrical hollow shape that rotatably engages with the helically threaded cylindrical outer surface of the lens barrel assembly 102 from the neck top end, along the Z-Axis 101. In an alternate embodiment, the neck member 108 may be of any other shape having at least three planar sides along the Z-Axis 101, which may be configured to slidably secure the similar shaped lens barrel assembly 102, via a friction fitting mechanism, along the Z-Axis 101. In another embodiment, the neck member 108 may be adjusted relative to the top member 110 through slide locking features. In other words, the neck member 108 may be rotatably adjusted relative to the top member 110 for a rotational adjustment of the lens barrel assembly 102 around the Z-Axis 101.

The top member 110 is secured with the neck member 108 through the slide locking features. In an embodiment, the top member 110 may provide rotating friction fitting members to tiltably engage with the frame member 112, along the second axis, i.e. the X-Axis 103. In an embodiment, a cover member 118 of the top member 110 may be secured within the frame member 112 through a snap-in feature member of the top member 110, as shown in FIG. 3G.

The frame member 112 tiltably engages with the top member 110 from the frame top end, in a manner such that the top member 110 is adjusted relative to the frame member 112 along the second axis for a tilt adjustment actuated by the tilt adjustment member 116. The frame member 112 tiltably engages the top member 110 through a plurality of fitting features, such as snap-in features and rotational friction fitting members, as shown in FIG. 3G. From the frame bottom end, the frame member 112 engages with the image sensor board assembly 114.

The image sensor board assembly 114 may include the image sensor 106 and image acquisition circuitry associated with the image sensor 106. In an embodiment, the image sensor 106 may be an area CCD having a window through which an incident image of the object may be received.

The tilt adjustment member 116, in an embodiment, may be positioned in the top member 110 in such a manner that causes tilt adjustment of the top member 110 relative to the frame member 112 along the second axis, i.e. the X-Axis 103. Accordingly, the tilt adjustment member 116 may be turned by an adjustment actuator action. However, in another embodiment, it may be possible to eliminate the tilt adjustment member 116. In such a case, the tilt adjustment of the top member 110 relative to a frame member 112 along the second axis, i.e. the X-Axis 103 may rely on a friction fitting between the top member 110 and the frame member 112. Accordingly, the adjustment actuator action applies a push force on the top member 110 to result in the same tilt adjustment, as described above in an embodiment where the tilt adjustment member 116 is implemented.

Figure 1D:
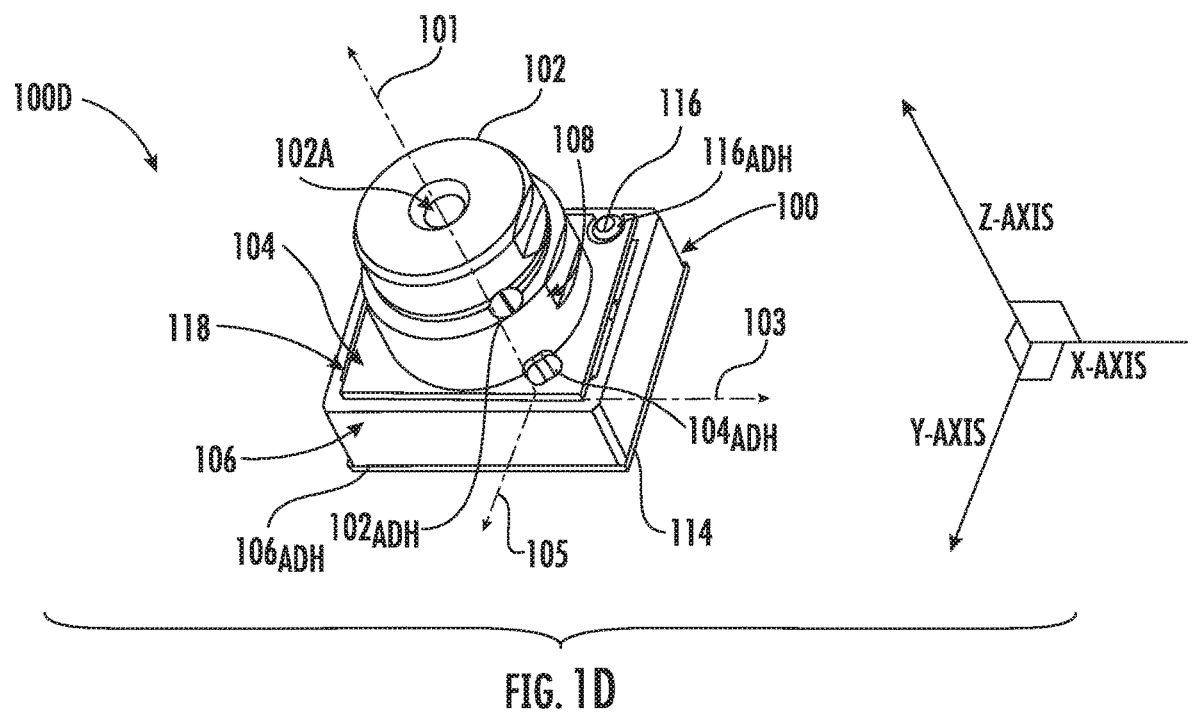

Referring to FIG. 1D, there is shown locking adhesives, depicted by $102_{Adh}$, $104_{Adh}$, $106_{Adh}$ and $116_{Adh}$, that may be dispensed at a plurality of points on the image focusing adjustment module assembly 100 to secure various members of the image focusing adjustment module assembly 100 together, as shown in the structural view 100B of the image focusing adjustment module assembly 100 without the cover member 118. For example, the focusing locking adhesive, depicted by $102_{Adh}$, may be dispensed at a first point at which the lens barrel assembly 102 abuts the neck member 108. Further, the rotating locking adhesive, depicted by $104_{Adh}$, may be dispensed at a second point at which the neck member 108 abuts the top member 110. Furthermore, the tilting locking adhesive, depicted by $116_{Adh}$, may be dispensed at a third point at which the tilt angle of the top member 110 is fixed relative to the frame member 112. Lastly, the sensor locking adhesive, depicted by $106_{Adh}$, may be dispensed along the periphery between the frame member 112 and the image sensor board assembly 114. Once dispensed, the focusing locking adhesive, depicted by $102_{Adh}$, the rotating locking adhesive, depicted by $104_{Adh}$, the sensor locking adhesive, depicted by $106_{Adh}$, and the tilting locking adhesive, depicted by $116_{Adh}$, are cured by the UV light once the lens barrel assembly 102 is adjusted relative to the neck member 108, the neck member 108 is adjusted relative to the top member 110, the frame member 112 is adjusted relative to the image sensor board assembly 114, and the top member 110 is adjusted relative to the frame member 112, respectively.

Figure 2A:
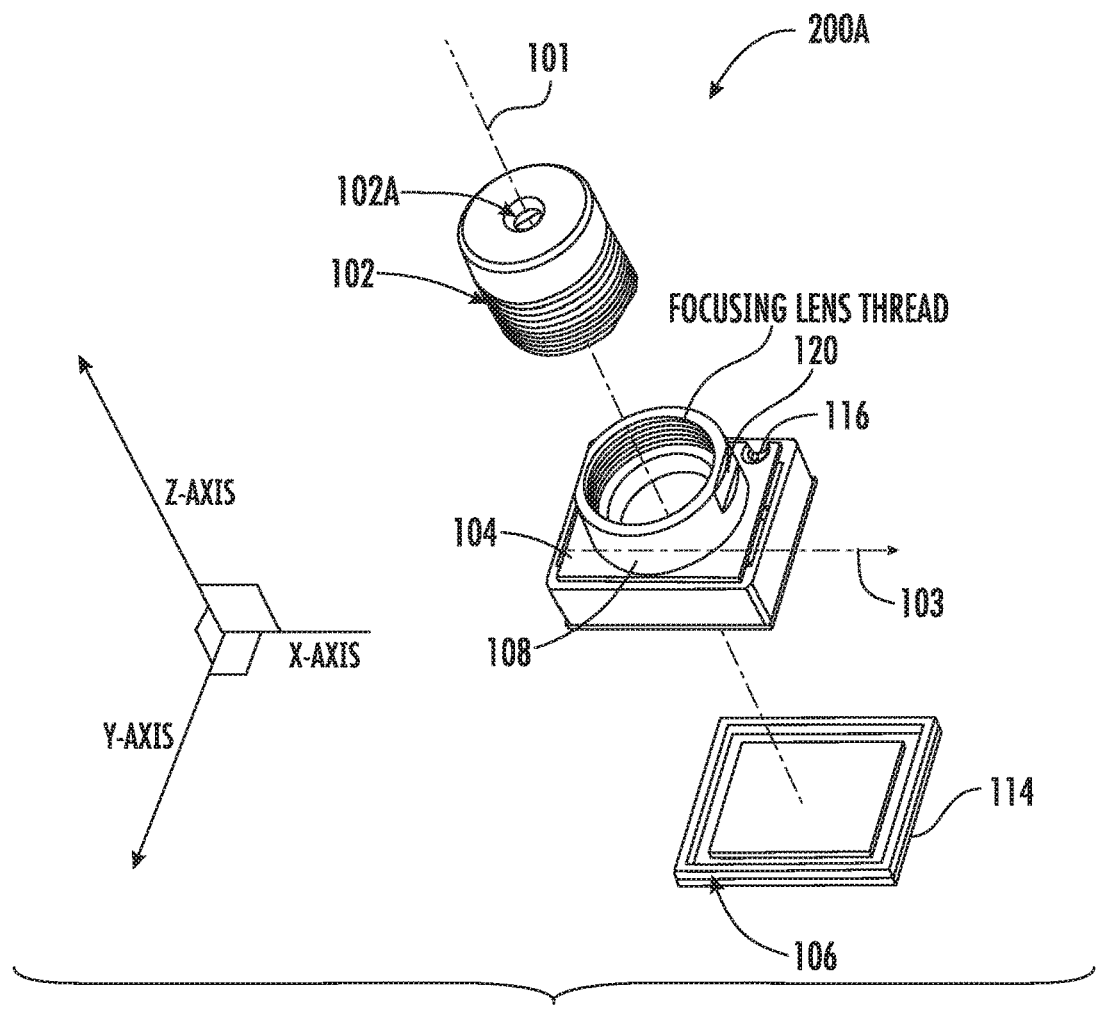
FIGS. 2A and 2B illustrate an exploded view and top view of the image focusing adjustment module assembly, according to one or more embodiments of the present disclosure.
Figure 2B:
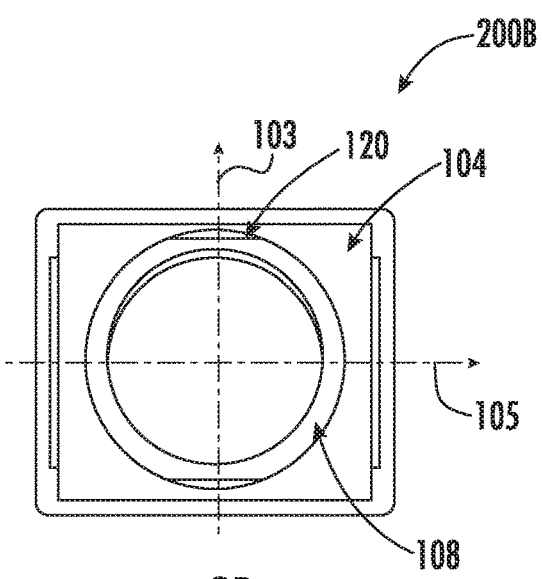
Figure 2C:
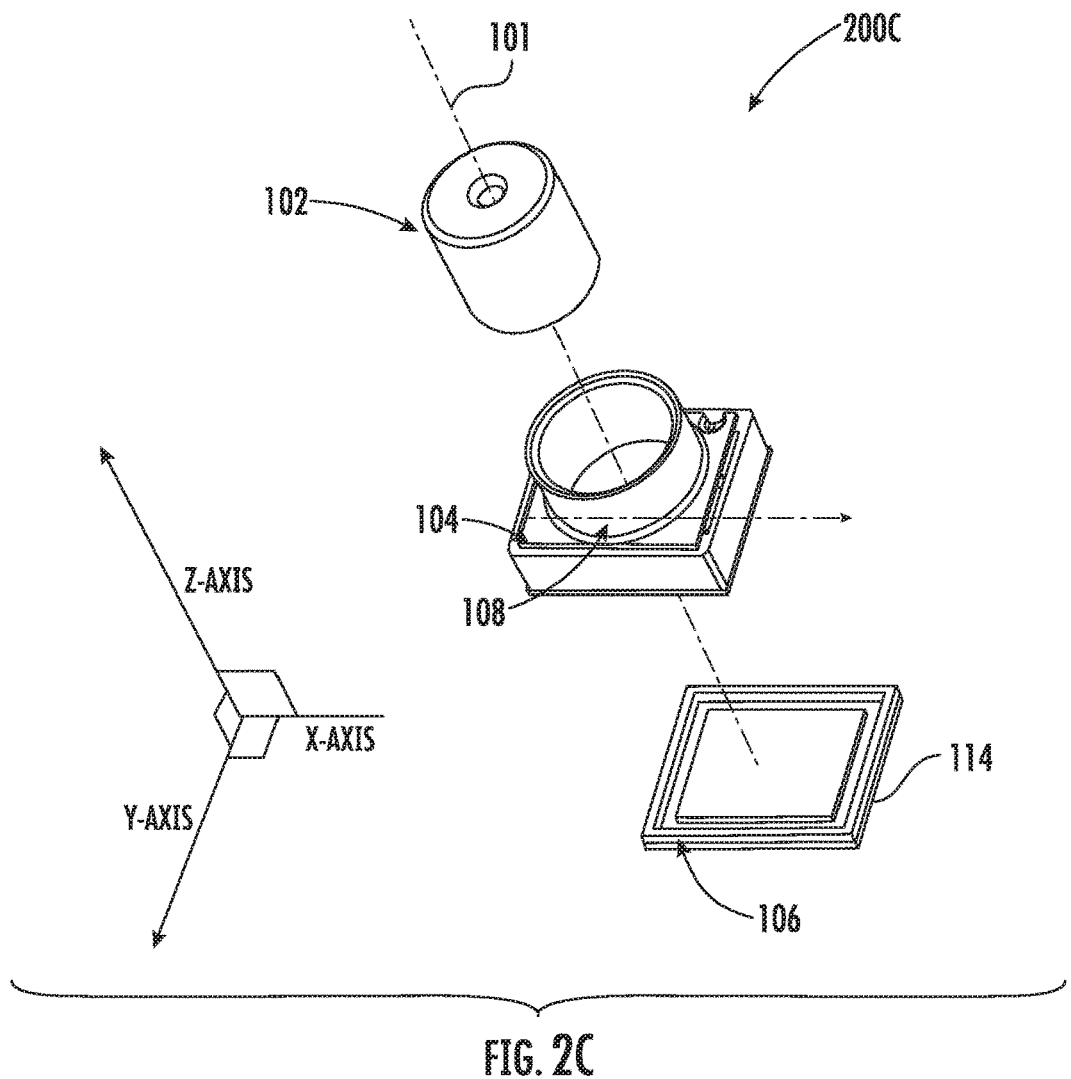
FIGS. 2C and 2D illustrate another exploded view and another top view of the image focusing adjustment module assembly, according to one or more embodiments of the present disclosure.
Figure 2D:
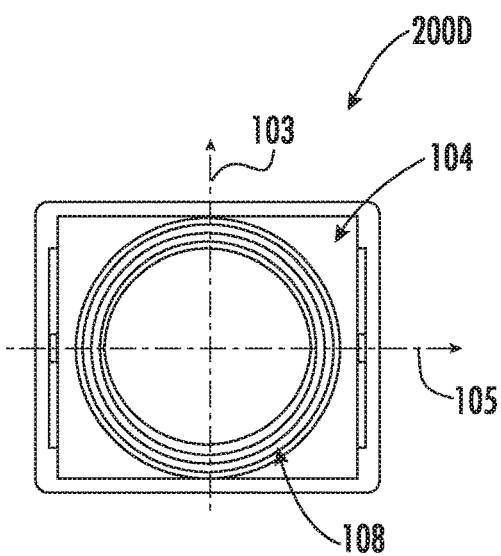

FIGS. 2A and 2B illustrate an exploded view 200A and a top view 200B of the image focusing adjustment module assembly 100, according to one or more embodiments of the present disclosure. FIG. 2A illustrates a threaded fitting fastening mechanism between the lens barrel assembly 102 and the neck member 108 of the focusing holder member 104, in accordance with an embodiment of the present disclosure. Further, FIGS. 2C and 2D illustrate another exploded view 200C and another top view 200D of the image focusing adjustment module assembly 100, according to one or more embodiments of the present disclosure. FIG. 2C illustrates a friction fitting fastening mechanism between the lens barrel assembly 102 and the neck member 108 of the focusing holder member 104, in accordance with another embodiment of the present disclosure. As illustrated in FIGS. 2A and 2C, in two example embodiments, the exploded views 200A and 200C of the image focusing adjustment module assembly 100 illustrate the lens barrel assembly 102, the focusing holder member 104, the image sensor 106, and the tilt adjustment member 116 separately.

Referring to FIG. 2A, in an example embodiment, there is shown the lens barrel assembly 102 in cylindrical shape and is helically threaded along the curved outer surface. Further, the neck member 108 is also shown to be helically threaded, complimentarily, along the curved inner surface. From the barrel bottom end of the lens barrel assembly 102, the helical threading allows the lens barrel assembly 102 to be secured within the threaded cavity provided by the neck member 108, which is protruding from the top member 110 of the focusing holder member 104. The lens barrel assembly 102 is adjusted relative to the neck member 108 for a translational adjustment of the lens barrel assembly 102 along the first axis, i.e. the Z-Axis 101. In other words, the focusing of the imaging lens 102A in the lens barrel assembly 102 may be achieved by rotating the lens barrel assembly 102 into or out of the neck member 108 of the focusing holder member 104 along the Z-Axis 101. The top view 200B of the focusing holder member 104 in accordance with such embodiment is shown in FIG. 2B.

Referring to FIG. 2C, in another embodiment, there is shown the lens barrel assembly 102 in a specific shape, for example cylindrical shape, friction fitted into the cavity provided by the neck member 108 of the focusing holder member 104. Friction fitting is a fastening mechanism between two parts, i.e. the lens barrel assembly 102 and the neck member 108, which is achieved by means of friction after the two parts are pushed against each other. For friction fitting, the inner diameter of the neck member 108 must be equal to or substantially equal to the outer diameter of the lens barrel assembly 102. The lens barrel assembly 102 is adjusted relative to the neck member 108 for a translational adjustment of the lens barrel assembly 102 along the first axis, i.e. the Z-Axis 101. In other words, the focusing of the imaging lens 102A may be achieved by sliding the lens barrel assembly 102 into or out of the neck member 108 of the focusing holder member 104 along the Z-Axis 101, as shown in FIG. 1A. The top view 200D of the focusing holder member 104 in accordance with such embodiment is also shown in FIG. 2D.

Figure 3A:
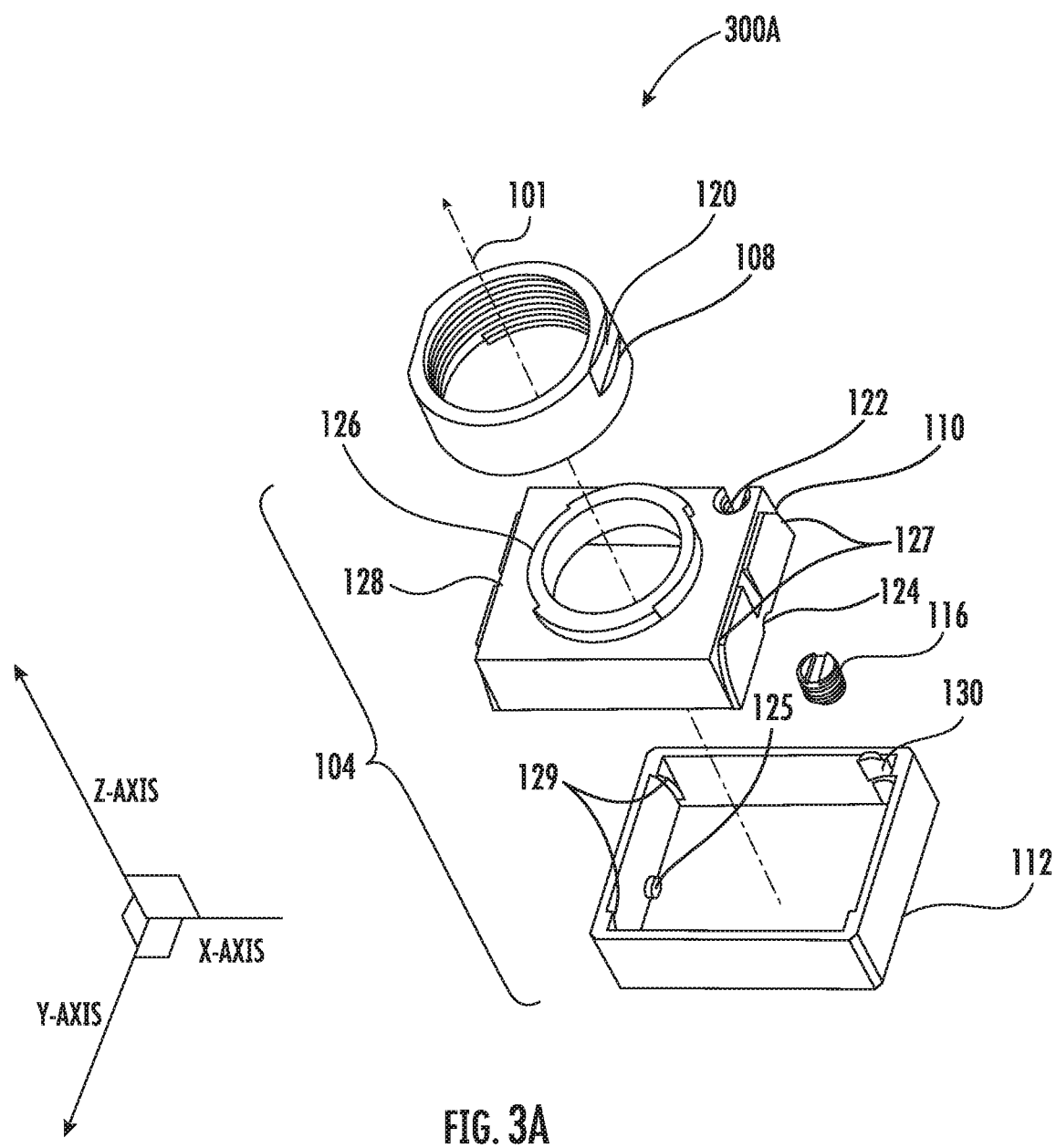
FIGS. 3A and 3B illustrate exploded views of the focusing holder member, according to various embodiments of the present disclosure.
Figure 3B:
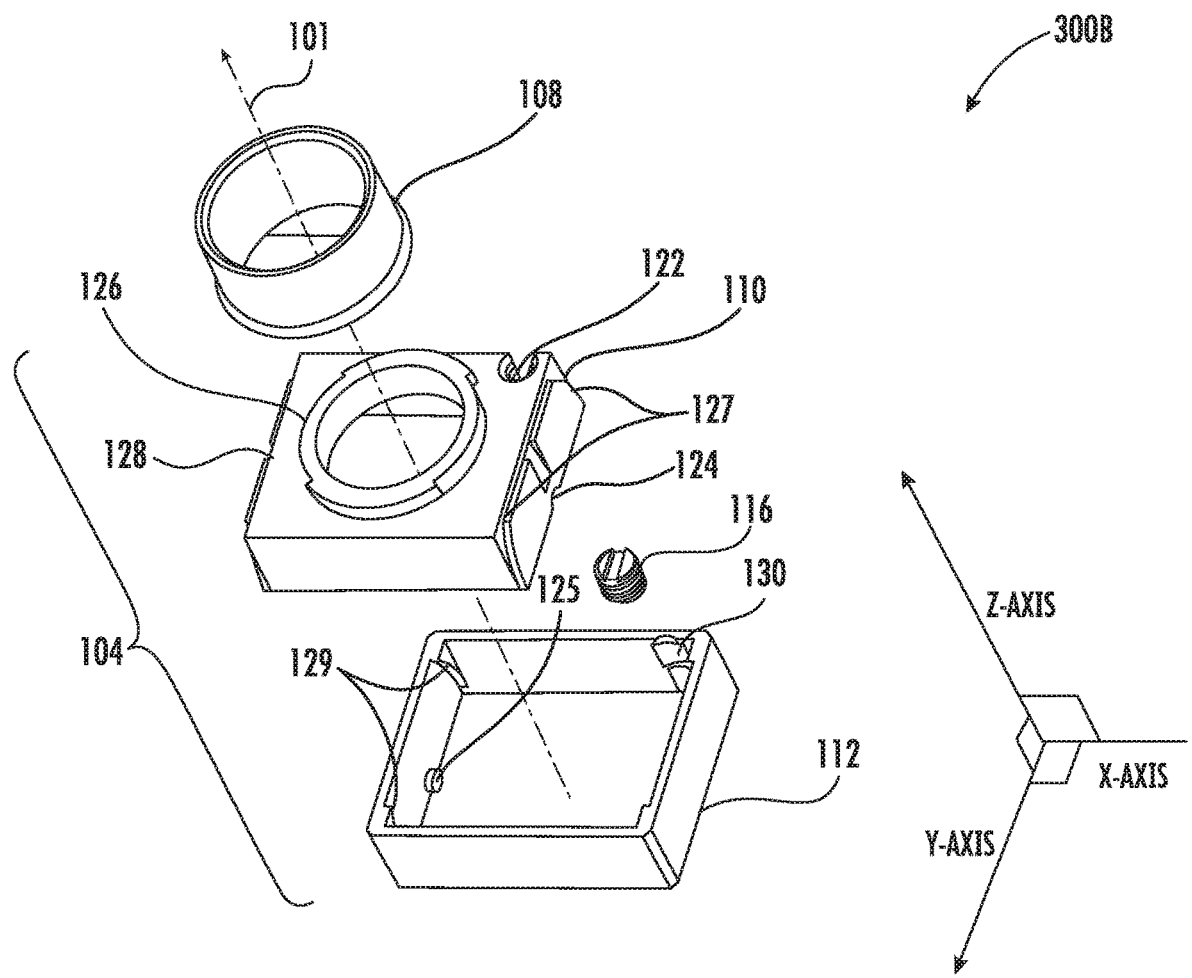

FIGS. 3A and 3B illustrate exploded views 300A and 300B of the focusing holder member 104, according to various embodiments of the present disclosure. As illustrated in FIG. 3A, in an example embodiment of the present disclosure, the exploded view 300A of the focusing holder member 104 illustrates the neck member 108 with threaded fitting fastening mechanism and rotational adjusting flat members 120 (located on the outer surface of the neck member 108 towards the neck top end, diametrically opposite to each other), the top member 110, the frame member 112, and the tilt adjustment member 116. As illustrated in FIG. 3B, in another example embodiment of the present disclosure, illustrates the neck member 108 with friction fitting fastening mechanism, the top member 110, the frame member 112, and the tilt adjustment member 116.

Referring to FIGS. 3A and 3B, there is further shown a groove member 122 for positioning the tilt adjustment member 116, a first rotation friction fitting tilt member 124, a second rotation friction fitting tilt member 125, a first rotation friction fitting member 127, a second rotation friction fitting member 129, sliding features 126, a set of snap-in features 128, and a curved flange member 130. FIGS. 3A and 3B are further described in conjunction with FIGS. 3C-3Q.

FIGS. 3A and 3B, in conjunction with FIGS. 3C-3F that illustrate various views of the neck member 108, illustrate that the rotational adjusting flat members 120 are positioned along diametrically opposite edges on the outer surface towards the neck top end of the neck member 108. The rotational adjusting flat member 120 facilitates the rotation of the neck member 108 relative to the top member 110 around the first axis, i.e. the Z-Axis 101, of the image focusing adjustment module assembly 100.

Figure 3D:
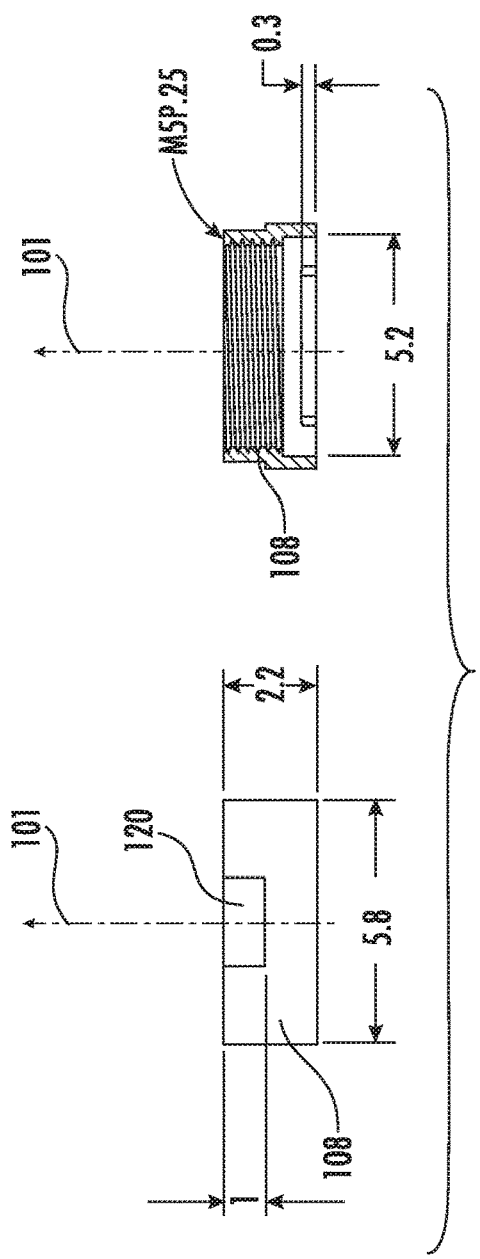
FIGS. 3C-3F illustrate various views of the neck member, according to various embodiments of the present disclosure.
Figure 3C:
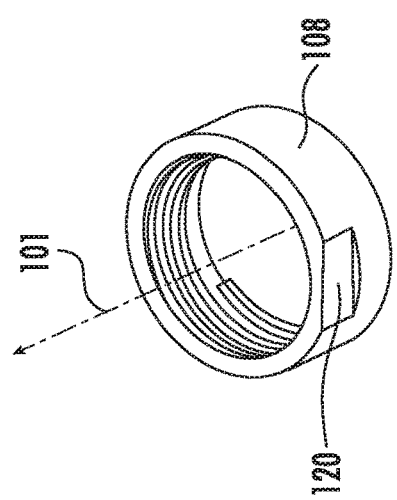
Figure 3F:
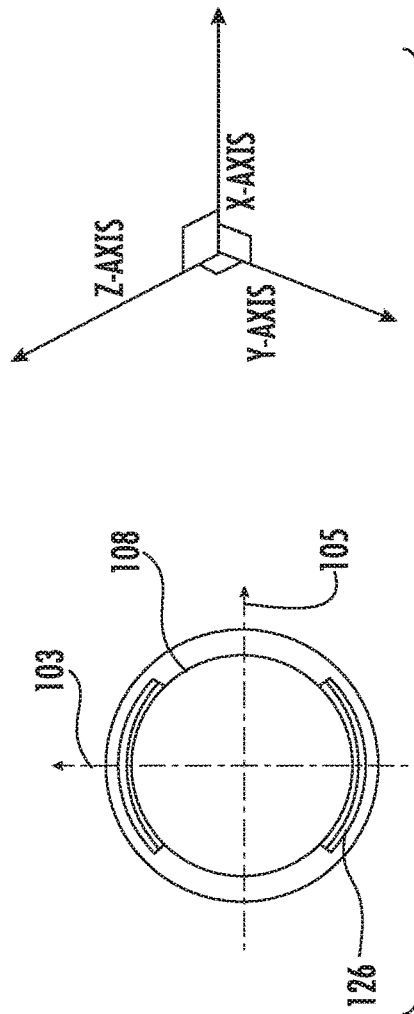
Figure 3E:
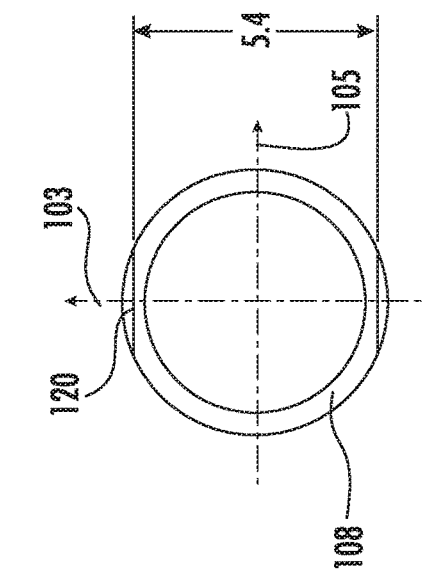
Figure 3J:
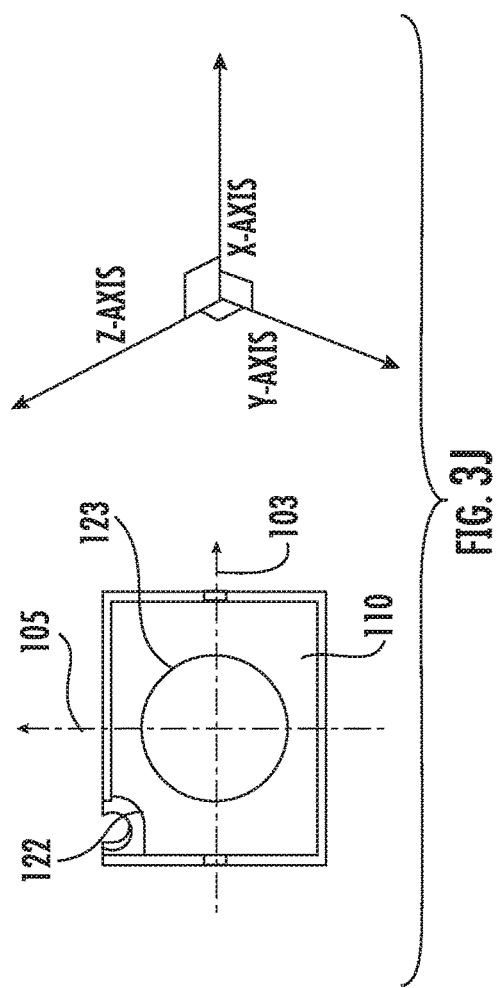
FIGS. 3G-3J illustrate various views of the top member, according to various embodiments of the present disclosure.

In an example embodiment, as illustrated in the side views of the neck member 108 in FIG. 3D, the outer diameter of the neck member 108, may be "5.8 mm". The orthogonal diameter of the neck member 108 across the rotational adjusting flat member 120, as illustrated in the top view of the neck member 108 in FIG. 3E, may be "5.4 mm". As illustrated in the side views of the outer surface of the neck member 108 in FIG. 3D, the length of each of the rotational adjusting flat member 120 starting from the top surface of the neck member 108 along the first axis is "1 mm" whereby the length of the neck member 108 along the first axis is "2.2 mm". Further, the inner diameter of the neck member 108 is illustrated to be "5.2 mm" whereby the height of the sliding features 126 relative to the neck bottom end of the neck member 108 along the first axis is "0.3 mm" and a specified threading standard is, for example "M5P 0.25".

Notwithstanding, it may be noted that the scope of the disclosure is not limited to the measurements, as described in the above example embodiment related to an example image focusing adjustment module assembly. The example embodiment shows a typical implementation with minimum wall thickness of 03~0.4 mm. In another example embodiment, such as the one implemented in actual application for ruggedized design with minimum wall thickness of 0.5~0.8 mm, the external dimensions may increase accordingly while maintaining inner features dimensions for functioning. In yet another example embodiment, such as the one implemented in slim and compact applications, the minimum wall thickness may be 0.15~0.25 mm. Accordingly, the external dimensions may reduce while maintaining inner feature dimensions for function. Further, the measurements, as described in the above example embodiment, shows the typical ⅓ inch imaging sensor format internal feature size. For different sensor sizes, the image sensor format may change. For example, a high-resolution sensor may have ½ inch or more image sensor format. On the other hand, a compact sensor may have ¼ or less image sensor format. Thus, alternate measurements may be possible on similar scale in other example embodiments related to other example image focusing adjustment module assemblies, without deviating from the scope of the disclosure.

FIGS. 3A and 3B, in conjunction with FIGS. 3G-3J that illustrate various views of the top member 110, illustrate sliding features 126 provided around a defined cavity 123 (FIG. 3J) on the top surface of the top member 110. As illustrated, the shapes of each of the cavity 123, the sliding features 126, and the lens barrel assembly 102 are similar. The sliding features 126 facilitate the fitting of the neck member 108 relative to the top member 110 of the image focusing adjustment module assembly 100. There are further shown various other members, such as the first rotation friction fitting tilt member 124, the first rotation friction fitting members 127, and the snap-in features 128 provided on the wall structure along the second dimension of the top member 110. The first rotation friction fitting tilt member 124 in the top member 110 abuts the second rotation friction fitting tilt member 125 in the frame member 112, and the first rotation friction fitting members 127 in the top member 110 abuts the second rotation friction fitting member 129 in the frame member 112, provide a means for tiltable engagement of the top member 110 relative to the frame member 112 along the X-Axis 103. Further, the snap-in features 128 provide a means for securing the cover member 118 in the top member.

Figure 3H:
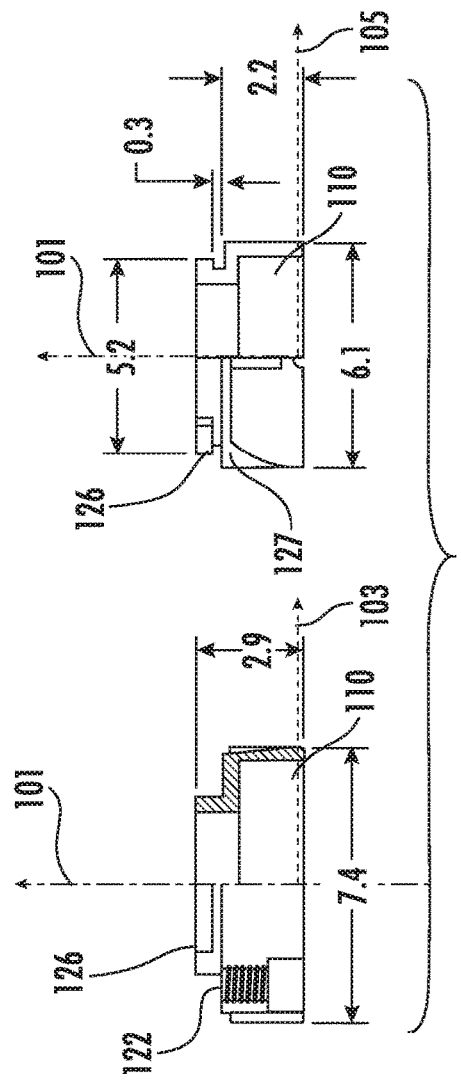
Figure 3I:
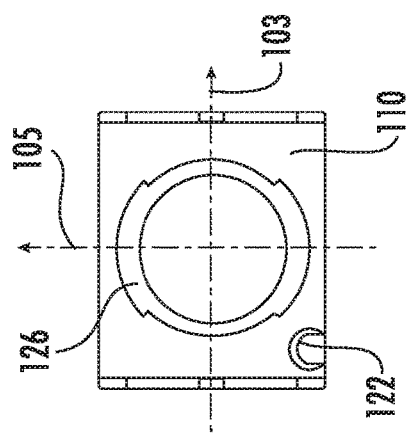
Figure 3G:
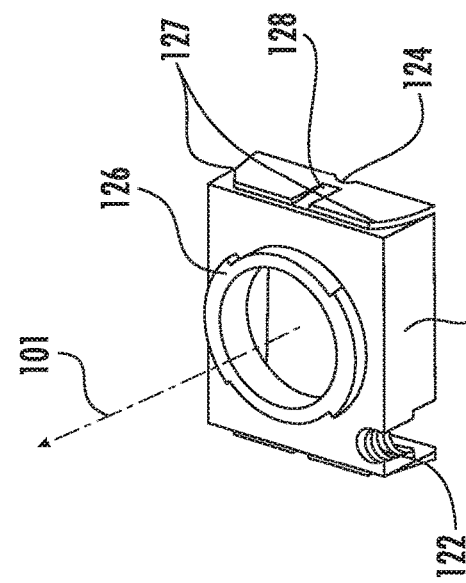

In an example embodiment, as illustrated in the side views of the top member 110 in FIG. 3H, a first dimension, i.e. the length, of the top member 110 along the X-Axis 103, may be "7.4 mm", a second dimension, i.e. the width, of the top member 110 along the Y-Axis 105, may be "6.1 mm", and a third dimension, i.e. the height, of the top member 110 along the Z-Axis 101, may be "2.9 mm". As further illustrated in the side views of the top member 110 in FIG. 3H, the sliding features 126 may be protruding from the top surface of the top member 110, which is at a height of "2.2 mm", by a height of "0.7 mm". Further, the rims of the sliding features 126 may be located at a height of "0.3 mm" from the top surface of the top member 110.

Notwithstanding, it may be noted that the scope of the disclosure is not limited to the measurements, as described in the above example embodiment related to an example image focusing adjustment module assembly. The example embodiment shows a typical implementation with minimum wall thickness of 03~0.4 mm. In another example embodiment, such as the one implemented in actual application for ruggedized design with minimum wall thickness of 0.5~0.8 mm, the external dimensions may increase accordingly while maintaining inner features dimensions for functioning. In yet another example embodiment, such as the one implemented in slim and compact applications, the minimum wall thickness may be 0.15~0.25 mm. Accordingly, the external dimensions may reduce while maintaining inner feature dimensions for function. Further, the measurements, as described in the above example embodiment, shows the typical ⅓ inch imaging sensor format internal feature size. For different sensor sizes, the image sensor format may change. For example, a high-resolution sensor may have ½ inch or more image sensor format. On the other hand, a compact sensor may have ¼ or less image sensor format. Thus, alternate measurements may be possible on similar scale in other example embodiments related to other example image focusing adjustment module assemblies, without deviating from the scope of the disclosure.

Also illustrated in the various views of the top member 110 in FIGS. 3G-3J, is the groove member 122, which may be positioned at a defined location towards a corner of the top member 110 such that a portion of the periphery of the groove member 122 is cut across by one of the first dimension or the second dimension. The depth of the groove member 122, the inner surface of which is threaded, is along the third dimension of the top member 110 for half of the third dimension. When the tilt adjustment member 116 with threaded outer surface is positioned in the groove member 122, the tilt adjustment member 116 applies a vertical force on the curved flange member 130 positioned under the groove member 122, in the lower half along the third dimension of the top member 110.

FIGS. 3A and 3B, in conjunction with FIGS. 3K-3N that illustrate various views of the frame member 112, illustrate the structure of the frame member 112 having the second rotation friction fitting tilt member 125 and the second rotation friction fitting members 129, defined along the wall structure of the second dimension of the frame member 112. The second rotation friction fitting tilt member 125 and the second rotation friction fitting members 129 facilitate the tiltable engagement of the top holder 110 relative to the frame member 112. The curved surface of the second rotation friction fitting members 129 in the frame member 112 abuts the curved surface of the first rotation friction fitting members 127 in the top holder 110 allowing the tiltable engagement of the top holder 110 in the frame member 112 and at the same time securing the top holder 110 within the frame member 112. The frame member 112 further includes the curved flange member 130 positioned under the groove member 122 of the top holder 110. When an external force is applied on the curved flange member 130 by suitably positioning the tilt adjustment member 116 in the groove member 122, the curved flange member 130 induces a counter force that is applied back to the top member 110 causing a stable engagement of the top member 110 relative to the frame member 112 in one of the various tilted positions of the top member 110. In an embodiment, the tilt adjustment of the top member 110 relative to the frame member 112 is along the X-Axis 103 when the second rotation friction fitting tilt member 125 and the second rotation friction fitting members 129 are positioned on the wall structure along the second dimension of the frame member 112. In an alternative embodiment, the tilt adjustment of the top member 110 relative to the frame member 112 may be along the Y-Axis 105 when the second rotation friction fitting tilt member 125 and the second rotation friction fitting members 129 are positioned on the wall structure along the first dimension of the frame member 112.

Figure 3L:
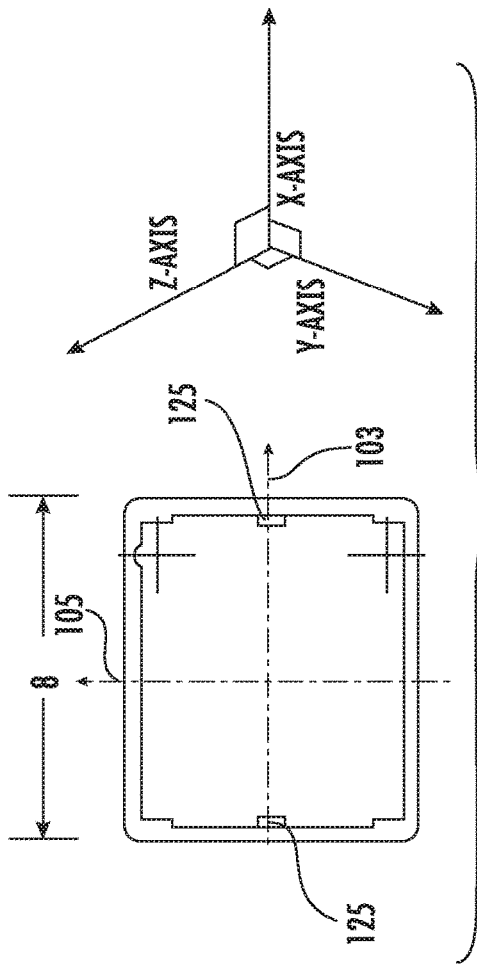
FIGS. 3K-3N that illustrate various views of the frame member, according to various embodiments of the present disclosure.
Figure 3K:
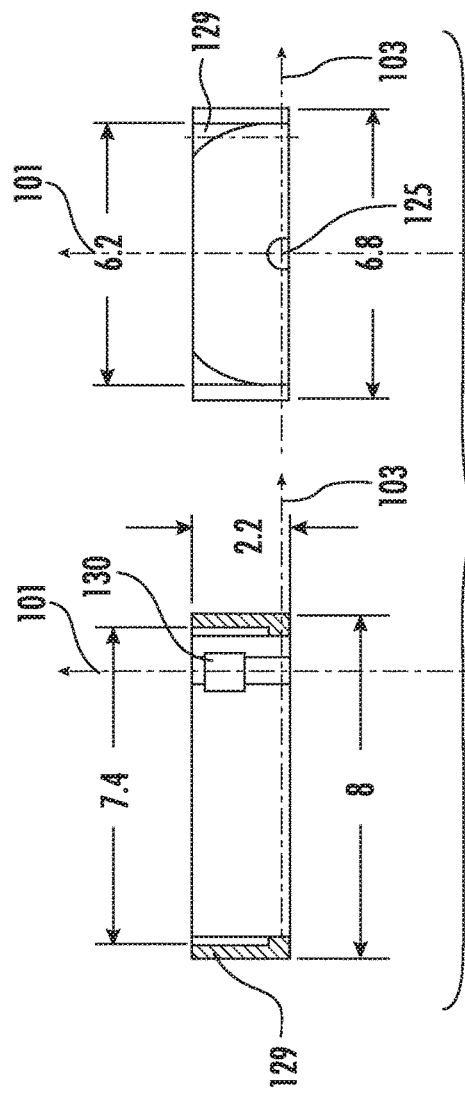
Figure 3N:
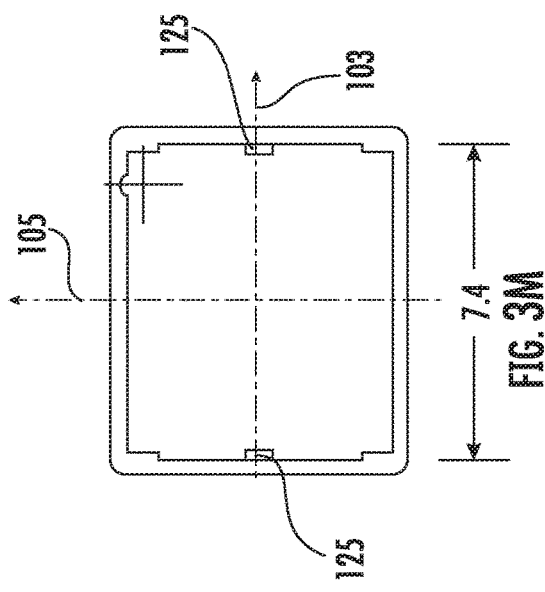
Figure 3M:
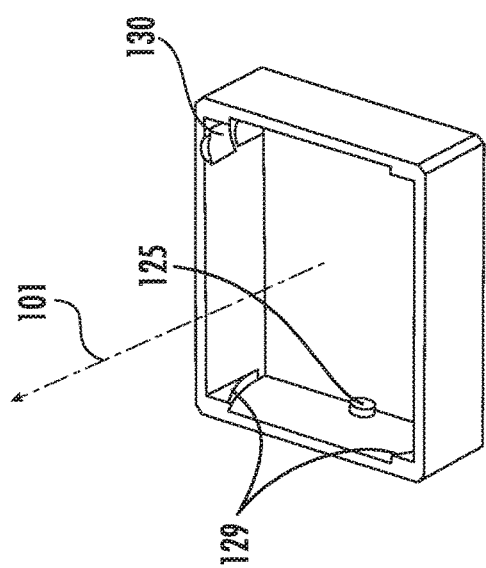

In an example embodiment, as illustrated in the top and bottom views of the frame member 112 in FIGS. 3M and 3N, the second rotation friction fitting tilt member 125 is a pair of semi-cylindrical members with the plane of the curved surface parallel to the plane of the wall structure along the second dimension. The second rotation friction fitting tilt member 125, adjacent to the frame bottom end of the frame member 112, protrudes out from the inner surfaces of the opposite wall structures along the second dimension along the mid-Axis parallel to the first dimension of the frame member 112. The outer surface of the second rotation friction fitting tilt member 125 in the frame member 112 slidably abuts the inner surface of the first rotation friction fitting tilt member 124 in the top holder 110, allowing the tiltable engagement of the top holder 110 in the frame member 112.

In an example embodiment, as illustrated in the side views of the frame member 112 in FIG. 3L, the first dimension, i.e. the length, of the frame member 112 along the X-Axis 103 between inner surfaces of the wall structures, excluding the second rotation friction fitting members 129, may be "7.4 mm", and outer surfaces of the wall structures, may be "8 mm". The second dimension, i.e. the maximum width, of the frame member 112 along the Y-Axis 105 between inner surfaces of the wall structures, excluding the second rotation friction fitting members 129, may be "6.2 mm", and between outer surfaces of the wall structures, may be "6.8 mm". The third dimension, i.e. the height of the frame member 112 along the Z-Axis 101, may be "2.2 mm".

Notwithstanding, it may be noted that the scope of the disclosure is not limited to the measurements, as described in the above example embodiment related to an example image focusing adjustment module assembly. The example embodiment shows a typical implementation with minimum wall thickness of 03~0.4 mm. In another example embodiment, such as the one implemented in actual application for ruggedized design with minimum wall thickness of 0.5~0.8 mm, the external dimensions may increase accordingly while maintaining inner features dimensions for functioning. In yet another example embodiment, such as the one implemented in slim and compact applications, the minimum wall thickness may be 0.15~0.25 mm. Accordingly, the external dimensions may reduce while maintaining inner feature dimensions for function. Further, the measurements, as described in the above example embodiment, shows the typical ⅓ inch imaging sensor format internal feature size. For different sensor sizes, the image sensor format may change. For example, a high-resolution sensor may have ½ inch or more image sensor format. On the other hand, a compact sensor may have ¼ or less image sensor format. Thus, alternate measurements may be possible on similar scale in other example embodiments related to other example image focusing adjustment module assemblies, without deviating from the scope of the disclosure.

Figure 3O:
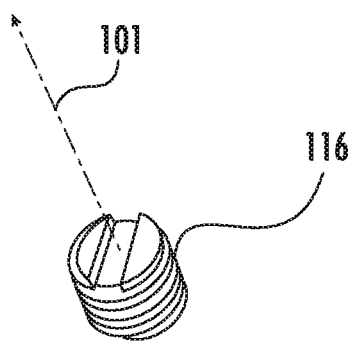
FIGS. 3O-3Q illustrate various views of the tilt adjustment member, according to various embodiments of the present disclosure.
Figure 3P:
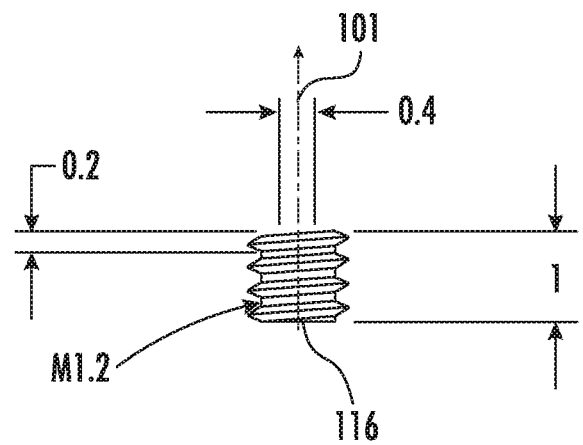
Figure 3Q:
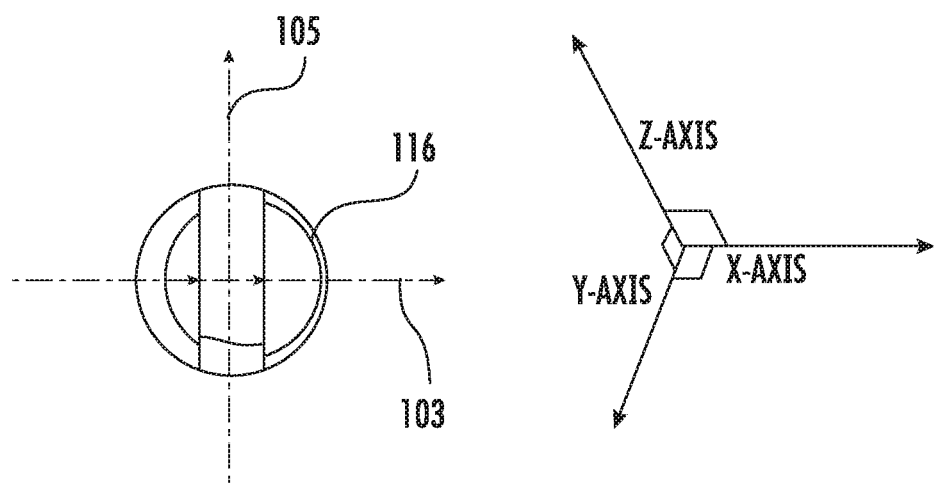

FIGS. 3A and 3B, in conjunction with FIGS. 3O-3Q that illustrate various views of the tilt adjustment member 116, illustrate the structure of the tilt adjustment member 116. In an embodiment, the tilt adjustment member 116 may be a set screw with a standard size of "M1.2". For example, as illustrated in the side view of the tilt adjustment member 116 in FIG. 3P, the length of the set screw along the Z-Axis 101, may be "1 mm", the depth of the set screw drive along the Z-Aaxis 101 may be "0.2 mm", and the width of the slot of the set screw drive along the X-Axis 103 may be "0.4 mm". When the tilt adjustment member 116 with threaded outer surface is positioned or displaced into the groove member 122 based on a combination of a rotational and a translational motion, the tilt adjustment member 116 applies a vertical force on the curved flange member 130, positioned under the groove member 122, and causes the top holder 110 to tilt relative to the frame member 112.

Notwithstanding, it may be noted that the scope of the disclosure is not limited to the measurements, as described in the above example embodiment related to an example image focusing adjustment module assembly. The example embodiment shows a typical implementation of commonly available smallest set screw dimensions. In another example embodiment, such as the one implemented in actual application for ruggedized design with minimum wall thickness and bigger external dimension top and frame members, bigger set screw, such as M2 with appropriate increased dimensions, may be selected. In yet another example embodiment, such as the one implemented in slim and compact applications, the set screw may be further pushed to M1 with reduced dimensions. Thus, alternate measurements may be possible on similar scale in other example embodiments related to other example image focusing adjustment module assemblies, without deviating from the scope of the disclosure.

Figure 4:
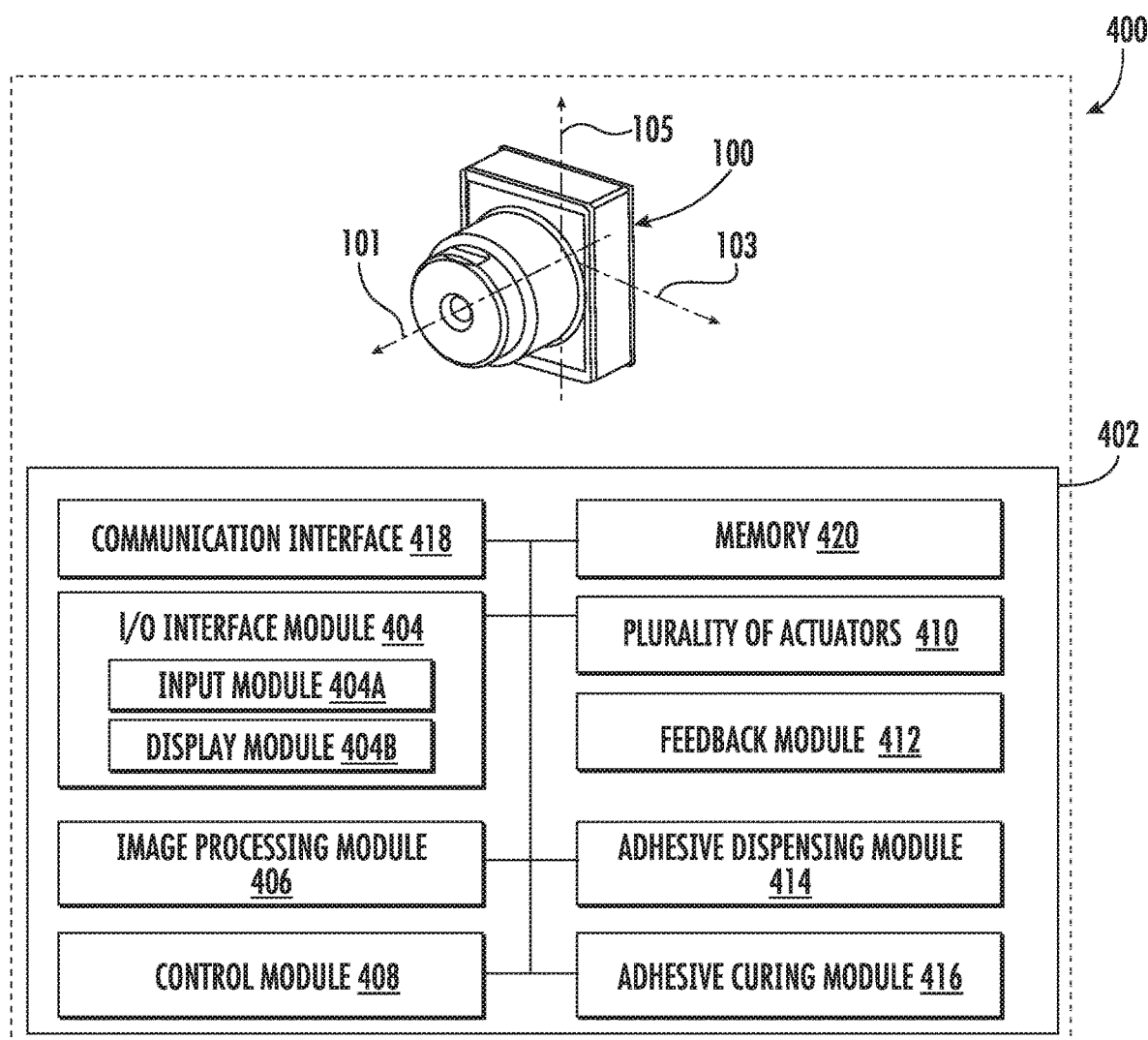
FIG. 4 illustrates a block diagram of an image focusing adjustment module system, according to one or more embodiments of the present disclosure.

FIG. 4 illustrates a block diagram of an image focusing adjustment module system 400, according to one or more embodiments of the present disclosure. As illustrated in FIG. 4, in an example embodiment, the block diagram of an image focusing adjustment module system 400 includes the image focusing adjustment module assembly 100 and a set of modules 402. The set of modules 402 further includes an input/output (I/O) interface module 404, an image processing module 406, a control module 408, a plurality of actuators 410, a feedback module 412, an adhesive dispensing module 414, an adhesive curing module 416, a communication interface 418, and a memory 420.

The I/O interface module 404 may include suitable logic and/or circuitry that may include an input module 404A operative to control input devices, such as a keypad, and a display module 404B operative to control display devices, such as touch sensitive display system, associated with the image focusing adjustment module assembly 100. In some embodiments, the I/O interface module 404 may also include optical sensor(s) module (not shown) operative to control one or more optical sensor(s) in the image focusing adjustment module assembly 100. The optical sensor(s) may include, but not limited to, a barcode sensor, a camera, and an image sensor.

The image processing module 406 may include suitable logic and/or circuitry that may be coupled to the control module 408 and configured to perform various image processing operations for the image focusing adjustment module assembly 100, as desired or needed. In accordance with various embodiments described herein, the image processing module 406 may include one or more processors, such as Central Processing Units (CPUs), Application Specific Integrated Circuits (ASICs), and/or Field Programmable Gate Arrays (FPGAs), memory controllers, and other components that are not shown for brevity, such as buses, etc.

In various embodiments of the disclosure, the image processing module 406 may be configured to receive a first image of a reference object in response to an input signal. Various examples of the input signal may include, but not limited to, an actuation of a hardware button press event, a software button press event, a provision of a voice command or a gesture input. In response to the input signal, the first image may be captured by the imaging lens 102A within the lens barrel assembly 102 and projected on the image sensor 106 of the image focusing adjustment module 100 operating in an initial state. The image processing module 406 may be further configured to analyze the captured first image of the reference object. The method for analysis has been described in detail in FIG. 8.

Figure 5:
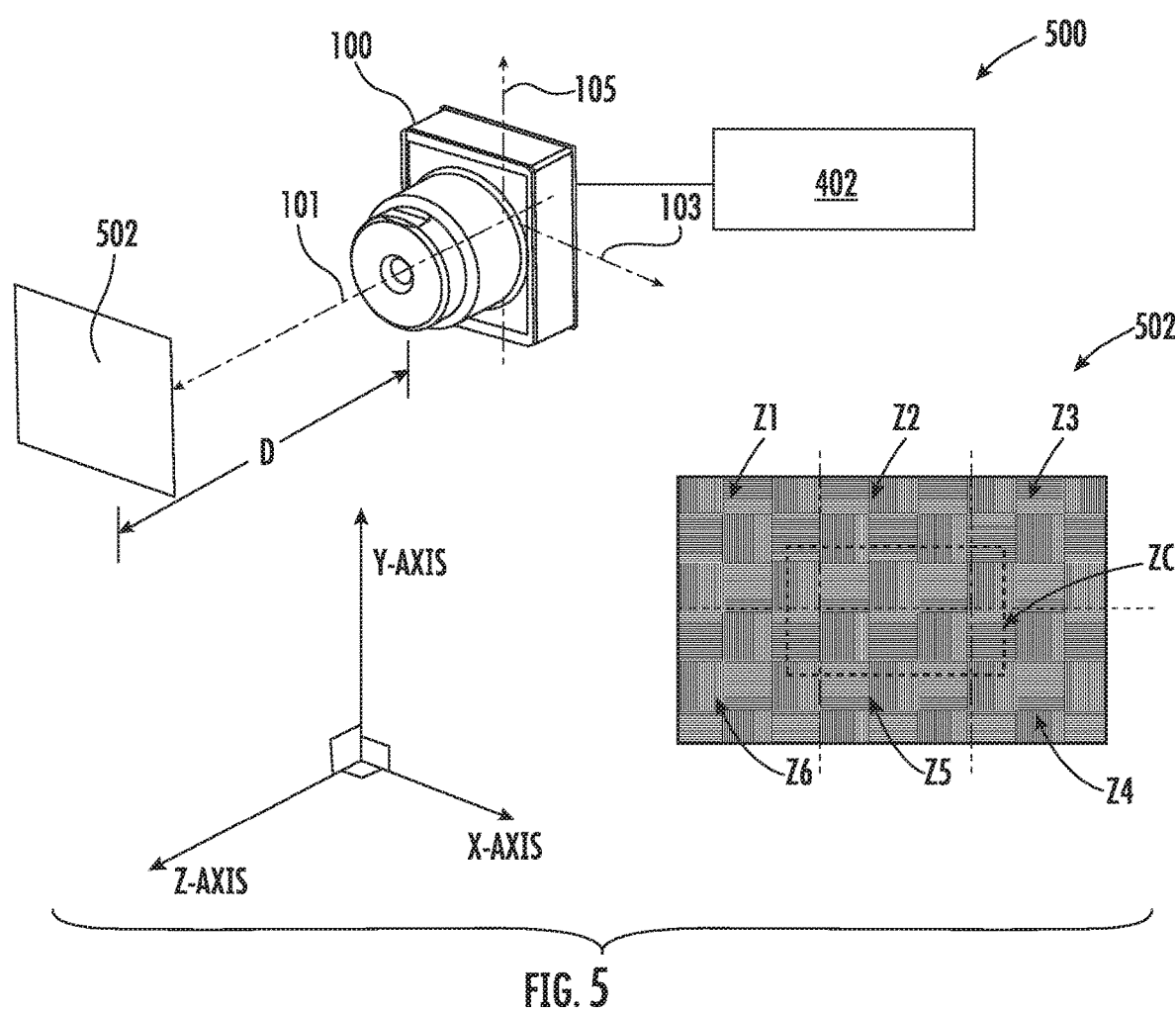
FIG. 5 illustrates a block diagram of an image focusing adjustment module environment, according to one or more embodiments of the present disclosure.

In an embodiment, the image processing module 406 may be further configured to determine a focus of the imaging lens 102A at a central zone of a plurality of zones, as further described in FIG. 5. In an embodiment, the focus of the imaging lens 102A may be adjusted by the plurality of actuators 410, under the control of the image processing module 406 and/or the control module 408. The focus of the imaging lens 102A may be adjusted based on a comparison of image characteristics of the pattern in an image at the central zone of the plurality of zones with threshold values during the translational adjustment of the lens barrel assembly 102 relative to the neck member 108 along the first axis (i.e. the Z-Axis 101). Various examples of the image characteristics may include, for example, a contrast level, a resolution level, an artifacts level, a blur level, a noise level, a distortion level, a light uniformity level, or a color accuracy level. The image processing module 406 may be configured to determine such image characteristics based on various image procession and computer vision techniques.

In an embodiment, the image processing module 406 may be configured to determine various image characteristics, such as, but not limited to the contrast level, the resolution level, the artifacts level, the blur level, the noise level, the distortion level, the light uniformity level, or the color accuracy level of the specific pattern in each of the plurality of zones in the image of the reference object 502 captured by the imaging lens 102A. Typically, the contrast level corresponds to a measurement of the ability of one or more members of the image focusing adjustment module assembly 100 to clearly separate the light and dark areas of the image of the reference object 502. The resolution corresponds to an ability of the one or more members of the image focusing adjustment module assembly 100 to clearly define a specific size or feature of a specific pattern of the reference object 502. Most commonly a grating may be used to measure the resolution in line pairs per mm, for example. The distortion level may correspond to an alteration of the image caused by imperfections or faults in one or more members of the image focusing adjustment module assembly 100. The light uniformity level may correspond to a difference between the brightest near-center light level and the darkest near-corner light level. Further, the light uniformity level may correspond to a difference between the brightest corner light level and the darkest corner light level. The color accuracy may correspond to a measure of color uniformity over the entire FOV to satisfy color shading variations to prevent center-to-corner, corner-to-corner, edge-to-edge, pinkish or bluish color shading. The color accuracy may further correspond to a measure of a difference between the resultant color and a standard test chart color. Such image characteristics may be determined by the image processing module 406 based on various image processing and computer vision techniques.

In an embodiment, the threshold values may be predefined at the time of manufacture of the image focusing adjustment module system 100 and stored in the firmware of the image focusing adjustment module system 100. In another embodiment, the threshold values may be defined manually by the user before operating the image focusing adjustment module system 100. In yet another embodiment, the threshold values may be determined automatically by the image processing module 406 and/or the control module 408, based on various characteristics of the components of the image focusing adjustment module system 100 and ambient conditions, such as external light conditions, in which the image focusing adjustment module system 100 is operating.

In another embodiment, the image processing module 406 may be further configured to determine one or more zones having corresponding image characteristics of the pattern that satisfy or fails to satisfy the threshold values. In certain embodiments, the image processing module 406 may determine one or more zones having corresponding image characteristics, for example contrast level and resolution level, of the pattern that satisfy the threshold values when the levels exceed the threshold values. In other embodiments, the image processing module 406 may determine one or more zones having corresponding image characteristics, for example distortion level and blur level, of the pattern that satisfy the threshold values when the levels do not exceed the threshold values.

Accordingly, the image processing module 406 may instruct the plurality of actuators 410 to reorient such one or more zones along the third axis, i.e. the Y-Axis 105, during the rotational adjustment of the neck member 108 relative to the top member 110 around the first axis (i.e. the Z-Axis 101).

In yet another embodiment, the image processing module 406 may be further configured to determine that the image is imbalanced based on comparison of image characteristics of the pattern in the image for the plurality of zones with the threshold values. Accordingly, the image processing module 406 may instruct the plurality of actuators 410 to perform tilt adjustment of the top member 110 relative to the frame member 112 along the second axis (i.e. the X-Axis 103) to balance the image.

The control module 408 may include suitable logic and/or circuitry that may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although illustrated in FIG. 4 as a single processor, in an embodiment, the control module 408 may include a plurality of processors and signal processing modules. The plurality of processors may be embodied on a single electronic device or may be distributed across a plurality of electronic devices collectively configured to function as the circuitry of the control module 408. The plurality of processors may be in operative communication with each other and may be collectively configured to perform one or more functionalities of the circuitry of the control module 408, as described herein. In an example embodiment, the control module 408 may be configured to execute instructions stored in the memory device 420 or otherwise accessible to the control module 408. These instructions, when executed by the control module 408, may cause the circuitry of the control module 408 to perform one or more of the functionalities, as described herein.

Whether configured by hardware, firmware/software methods, or by a combination thereof, the image processing module 406 may include an entity capable of performing operations according to embodiments of the present disclosure while configured accordingly. Thus, for example, when the control module 408 is embodied as an ASIC, FPGA or the like, the control module 408 may include specifically configured hardware for conducting one or more operations described herein. Alternatively, as another example, when the control module 408 is embodied as an executor of instructions, such as may be stored in the memory device 420, the instructions may specifically configure the control module 408 to perform one or more algorithms and operations described herein.

Thus, the control module 408 used herein may refer to a programmable microprocessor, microcomputer or multiple processor chip or chips that can be configured by software instructions (applications) to perform a variety of functions, including the functions of the various embodiments described above. In some devices, multiple processors may be provided. The multiple processors may be dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

In various embodiments, the control module 408, in conjunction with the image processing module 406, may be configured to provide instructions to the plurality of actuators 410 to control the spatial adjustment of various members with respect to one another. For example, the control module 408, in conjunction with the image processing module 406, provides instructions to the plurality of actuators 410 to (i) rotate the lens barrel assembly 102 relative to the neck member 108 along the first axis that causes a translational adjustment of the lens barrel assembly 102, (ii) rotate the neck member 108 relative to the top member 110 around the first axis that causes a rotational adjustment of the lens barrel assembly 102, and (iii) position the tilt adjustment member 116 that causes tilt adjustment of the top member 110 relative to the frame member 112 along the second axis.

The plurality of actuators 410, under the control of the image processing module 406 and/or the control module 408, may be configured to control various members of the image focusing adjustment module assembly 100. The plurality of actuators 410, under the image processing module 406 and/or the control module 408, may control the spatial adjustment of various members with respect to one another. The plurality of actuators 410 may be operated by a source of energy, typically an electric current, a hydraulic fluid pressure, or a pneumatic pressure, and converts the energy into motion that controls the spatial adjustment of various members with respect to one another. The various members may be the lens barrel assembly 102, the neck member 108, the top member 110, the frame member 112, and the tilt adjustment member 116.

For example, a first actuator from the plurality of actuators 410, under the control of the image processing module 406 and/or the control module 408, may be configured to rotate the lens barrel assembly 102 relative to the neck member 108, a second actuator from the plurality of actuators 410, under the control of the image processing module 406 and/or the control module 408, may be configured to rotate the neck member 108 relative to the top member 110, a third actuator from the plurality of actuators 410, under the control of the image processing module 406 and/or the control module 408, may be configured to adjust the tilt angle of the top member 110 relative to the frame member 112 by suitable positioning (i.e. fastening in or fastening out) the tilt adjustment member 116.

The feedback module 412 may include suitable logic and/or circuitry that may be configured to communicate a feedback signal to the control module 408 based on an analysis of an image of the reference object that is captured by the imaging lens 102A of the image focusing adjustment module 100 operating in various states other than the initial state. In an embodiment, the feedback signal may communicate to the image processing module 406 and/or the control module 408 to re-iterate the plurality of adjustments of the plurality of members of the image focusing adjustment module assembly 100 until the various image characteristics of the image of the reference object satisfy the threshold values. In another embodiment, feedback signal may communicate to the image processing module 406 and/or the control module 408 to terminate further adjustments of the plurality of members of the image focusing adjustment module assembly 100 when the various image characteristics of the image of the reference object satisfy the threshold values. The feedback module 412 may include one or more processors, such as ASICs and/or FPGAs to generate such feedback signals.

The adhesive dispensing module 414 may include suitable logic and/or circuitry that may be configured to control a motorized adhesive dispensing apparatus (not shown). The motorized adhesive dispensing apparatus may be mounted to the top and front portion of a robotic arm via mount or an actuator. The adhesive dispensing module 414 may cause dispensing a specific adhesive composition, such as the UV curable laminating adhesive composition, on specific points of the spatial arrangements of various members of the image focusing adjustment module assembly 100. For example, the focusing locking adhesive, depicted by $102_{Adh}$, is dispensed between the lens barrel assembly 102 and the neck member 108, the rotating locking adhesive, depicted by $104_{Adh}$, is dispensed between the neck member 108 and the top member 110, and the tilting locking adhesive, depicted by $116_{Adh}$, is dispensed between the top member 110 and the frame member 112. The UV curable laminating adhesive composition may be defined as adhesives or glues that may be cured, solidified, or hardened only when exposed to a source of UV radiation with a pre-defined intensity and wavelength. Examples of such adhesives with UV curing technology may include, but are not limited to, UV Epoxy, UV Acrylic, UV Silicone, UV Cyanoacrylate, and UV Anaerobic.

The adhesive curing module 416 may include suitable logic and/or circuitry that may be configured to control a UV curing apparatus based on various parameters, such as intensity or quantity of UV light applied, time of application of the UV light, distance of application of the UV light to the adhesive, thickness of the adhesive, permeability of the substrate which must pass through the UV light, and the like. For example, the adhesive curing module 416 may control the UV curing apparatus that cures each of the focusing locking adhesive, depicted by $102_{Adh}$, is dispensed between the lens barrel assembly 102 and the neck member 108, the rotating locking adhesive, depicted by $104_{Adh}$, is dispensed between the neck member 108 and the top member 110, and the tilting locking adhesive, depicted by $116_{Adh}$, is dispensed between the top member 110 and the frame member 112 with the UV light.

The communication module 418 may be embodied as an interface, device, or means embodied in circuitry, hardware, a computer program product including computer readable program instructions stored on a computer readable medium (e.g., the memory 420) and executed by a processing device (e.g., the image processing module 406 and/or the control module 408), or any combination thereof that is configured to receive/transmit image data between the image focusing adjustment module assembly 100 and the set of modules 402 of the image focusing adjustment module system 400, a system, and/or a network. In an example embodiment, the communication module 418 (like other components discussed herein) may be at least partially embodied as, or otherwise controlled by, the image processing module 406 and/or the control module 408. In this regard, the communication module 418 may be in communication with the image processing module 406 and/or the control module 408, via a bus or other such means.

The communication module 418 may include, for example, an antenna, a transmitter, a receiver, a transceiver, a network interface card, and/or supporting hardware and/or firmware/software to enable communication with another electronic device. The communication module 120 may be configured to receive and/or transmit signals and/or data that may be stored by the memory 118 by use of a protocol for communication between the image focusing adjustment module assembly 100 and the set of modules 402 of the image focusing adjustment module system 400, or other external systems, devices, or networks. The communication module 418 may additionally or alternatively be in communication with the memory 420 and/or any components of the circuitry of the image focusing adjustment module system 400, via a means, such as a bus. In various embodiments, wireless communication interface of the communication module 418 may be configured to support, for example, but not limited to, various protocols, such as IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

It may be noted that all or some of the information presented by the examples discussed herein may be based on data that is received, generated and/or maintained by one or more components of a local or networked system and/or the circuitry of the image focusing adjustment module system 400. In an example embodiment, one or more external systems (such as a remote cloud computing and/or data storage system) may also be leveraged to provide at least some of the functionality discussed herein.

The memory 420 may include suitable logic, circuitry, and/or interfaces that are adapted to store a set of instructions that is executable by the image processing module 406 and/or the control module 408 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 420 may be integrated with the image processing module 406 and/or the control module 408 on a single chip, without departing from the scope of the disclosure.

As described above and as will be appreciated that, based on this disclosure, embodiments of the present disclosure may be configured as methods, personal computers, servers, mobile devices, backend network devices, and the like. Accordingly, embodiments may include various means included entirely of hardware or any combination of software and hardware. Furthermore, embodiments may take the form of a computer program product on at least one non-transitory computer-readable storage medium having computer-readable program instructions (such as, computer software) embodied in the storage medium. Any suitable computer-readable storage medium may be utilized including non-transitory hard disks, CD-ROMs, flash memory, optical storage devices, or magnetic storage devices.

FIG. 5 illustrates a block diagram of an image focusing adjustment module environment 500, according to one or more embodiments of the present disclosure. As illustrated in FIG. 5, in an example embodiment, the block diagram of image focusing adjustment module environment 500 includes the image focusing adjustment module assembly 100, the set of modules 402, and a reference object 502. In an embodiment, the set of modules 402 may be integrated with an external remote device (not shown) and communicate with the image focusing adjustment module assembly 100, via the communication interface 418. In another embodiment, the set of modules 402 may be integrated with the image focusing adjustment module assembly 100, and thus, the image focusing adjustment module assembly 100 may operate as a stand-alone device.

The reference object 502 may include a specific pattern, such as a line pattern, a dot pattern, grid dot arrays, sunburst pattern, bar pattern, square net pattern, or other such pattern, over a field of view (FOV) of the imaging lens 102A in the lens barrel assembly 102. In an embodiment, the reference object 502 may be a monochrome test chart. In other embodiments, the reference object 502 may be a colored test chart. As illustrated in FIG. 5, the reference object 502 includes a line pattern.

The image processing module 406 may be configured to determine a plurality of zones in the captured image of the reference object 502. For example, as illustrated in FIG. 5, the image processing module 406 may determine six zones, depicted as $Z_1$-$Z_6$, in the image of the reference object 502. The image processing module 406 may determine such zones, based on one or more image segmentation techniques.

In an embodiment, the image characteristics of the specific pattern in each of the plurality of zones in the image of the reference object 502 may indicate an image quality of the image. For example, if the cumulative image characteristics of the specific pattern in one or more of the plurality of zones in the image of the reference object 502 satisfies (i.e. exceeds) a threshold value, the image quality of the image of the reference object 502 is high. In another example, if the cumulative image characteristics of the specific pattern in one or more of the plurality of zones in the image of the reference object 502 fails to satisfy (i.e. is less than) the threshold value, the image quality of the image of the reference object 502 is low.

Figure 6:
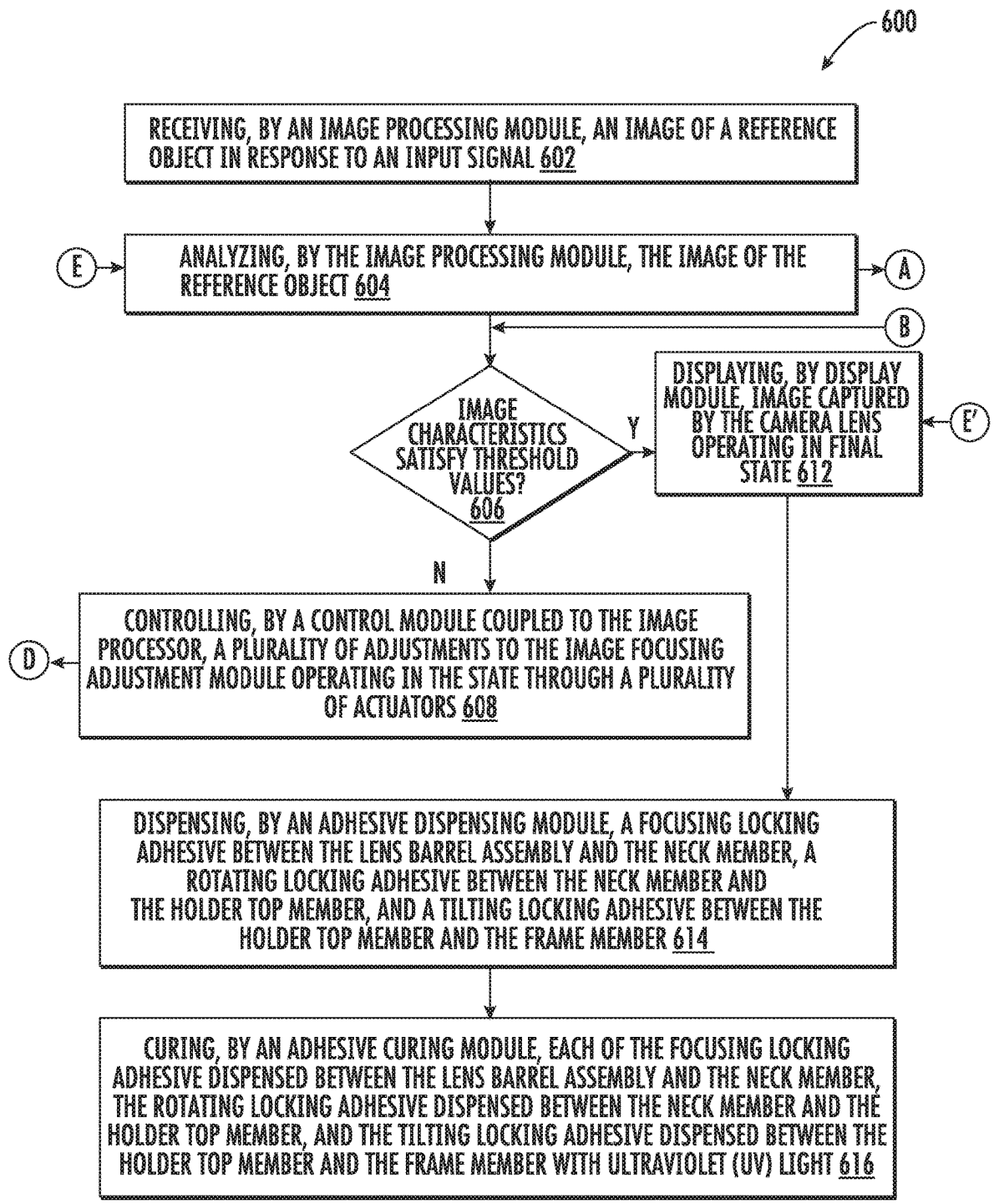
FIG. 6 illustrates a main flowchart depicting main operations for image focusing adjustment in the image focusing adjustment module system, according to one or more embodiments of the present disclosure.
Figure 7:
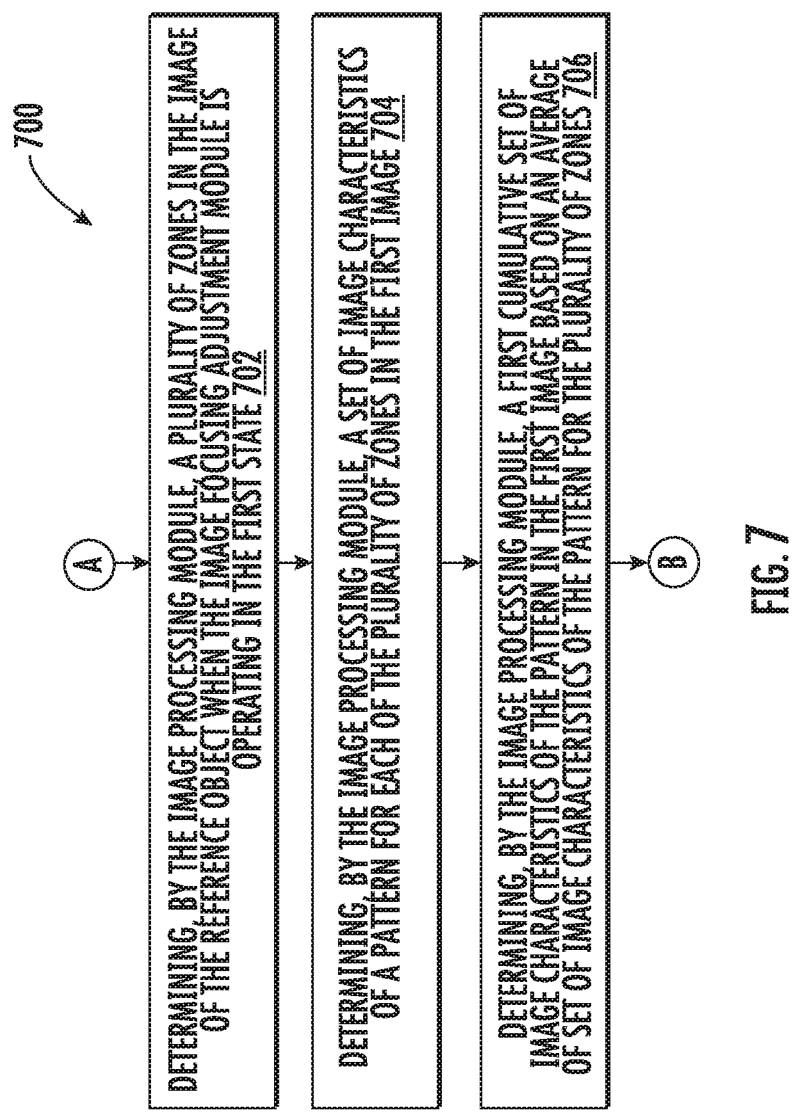
FIG. 7 illustrates a flowchart depicting operations for analysis of image of a reference object in the image focusing adjustment module system, according to one or more embodiments of the present disclosure.
Figure 8:
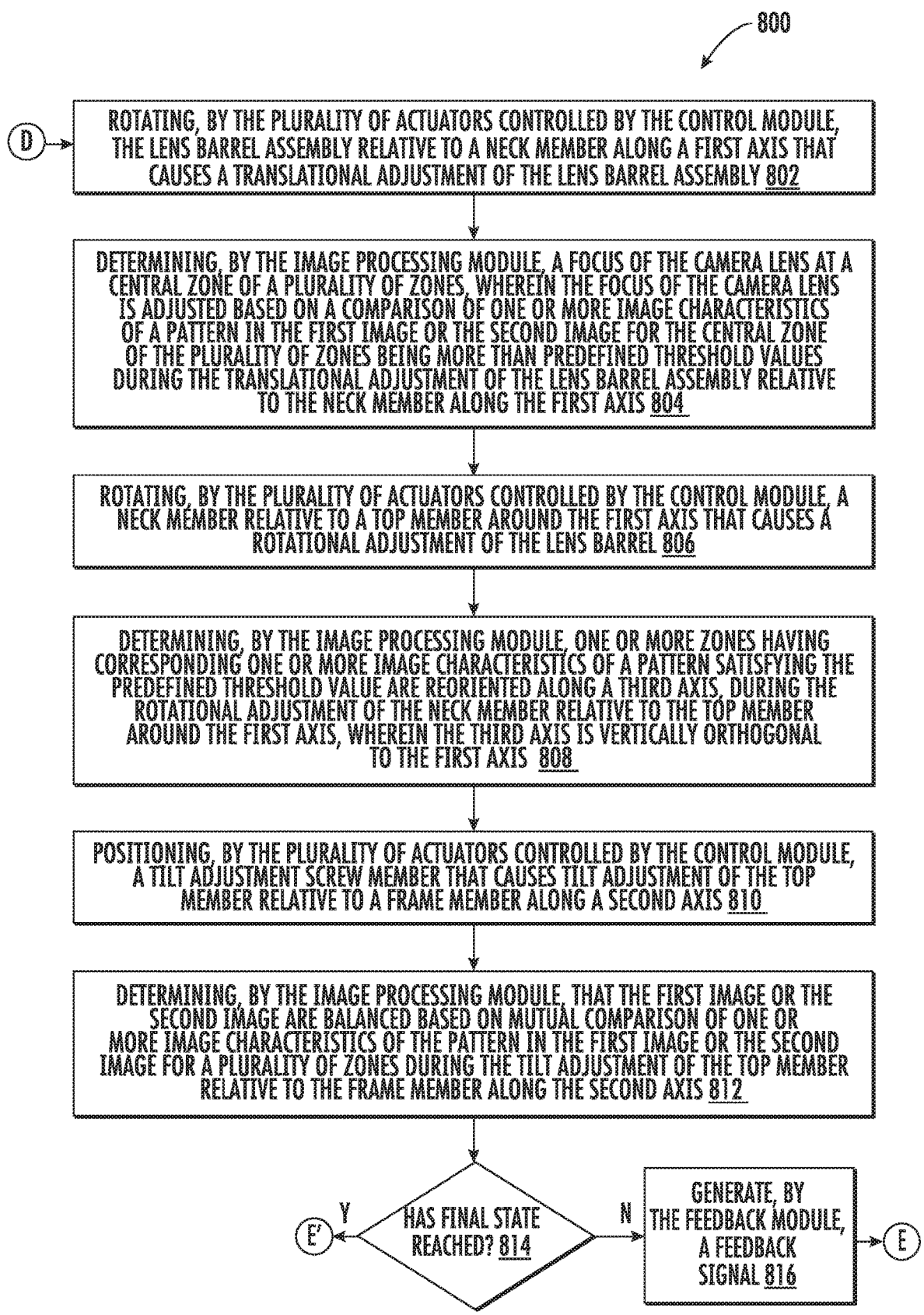
FIG. 8 illustrates another flowchart depicting operations for controlling a plurality of adjustments to the image focusing adjustment module in the image focusing adjustment module system, according to one or more embodiments of the present disclosure.

FIGS. 6-8 illustrate example flowcharts of operations performed by the image focusing adjustment module assembly 100, in accordance with example embodiments of the present disclosure. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by the memory 420 of the image focusing adjustment module system 400 employing an embodiment of the present disclosure and executed by a processor in the image focusing adjustment module system 400.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 6-8, when executed, convert a computer or processing circuitry into a particular machine configured to perform an example embodiment of the present invention. Accordingly, the operations of FIGS. 6-8 define algorithms for configuring a computer or processor, to perform an example embodiment. In some cases, a general-purpose computer may be provided with an instance of the processor which performs the algorithms of FIGS. 6-8 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 6 illustrates a flowchart 600 depicting operations for image focusing adjustment in the image focusing adjustment module system 400. FIG. 7 illustrates a flowchart 700 depicting operations for analysis of an image of a reference object in the image focusing adjustment module system 400. FIG. 8 illustrates another flowchart 800 depicting operations for controlling a plurality of adjustments to the image focusing adjustment module assembly 100 in the image focusing adjustment module system 400.

Turning to operation 602, the image focusing adjustment module assembly 100 includes means, such as the image processing module 406, for receiving an image of the reference object 502 in response to an input signal. In an embodiment, the image processing module 406 may be configured to receive an image of the reference object 502 from the image sensor 106. As the flowchart is illustrated to be executing in an iterative manner, in an example embodiment, the received image of the reference object 502 may correspond to a first image and the image focusing adjustment module assembly 100 may be considered operating in an initial state.

Figure 9:
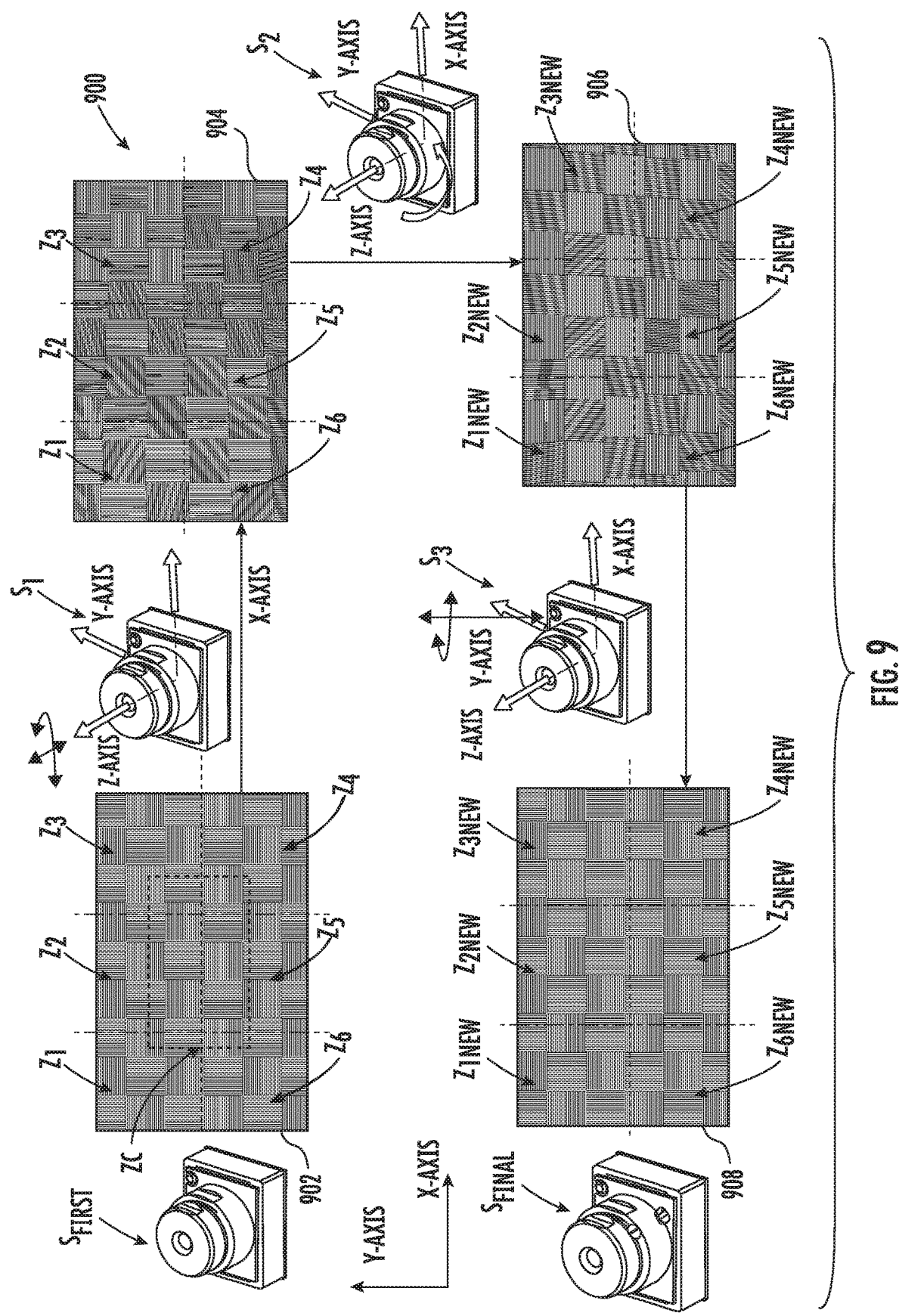
FIG. 9 illustrates an example embodiment for showing the various operating states of the image focusing adjustment module assembly and corresponding images of the reference object, according to one or more embodiments of the present disclosure.

Prior to operation 602, an input signal may be provided to the image focusing adjustment module assembly 100 to capture an image of the reference object 502 positioned at a predefined distance in front of the image focusing adjustment module assembly 100. As discussed supra, the reference object 502 may include a specific pattern, such as a line pattern, a dot pattern, grid dot arrays, sunburst pattern, bar pattern, square net pattern, or other such pattern, over a field of view (FOV) of the imaging lens 102A in the lens barrel assembly 102. As illustrated in FIGS. 5 and 9, the reference object 502 includes a line pattern and positioned at a predefined distance "D" away from the image focusing adjustment module assembly 100.

In an embodiment, a user may provide the input signals, for example, by pressing a hardware button or a software button positioned on the image focusing adjustment module assembly 100 or another device communicatively connected to the image focusing adjustment module assembly 100. The user may further provide the input signals, for example, by issuing a voice command or a gesture input relative to the image focusing adjustment module assembly 100. In an alternate embodiment, an actuator of the plurality of actuators 410 may be pre-programmed and controlled by the control module 408 to provide the input signal by one or more of the aforesaid means.

In response to the input signal, an aperture opens at the front of the image focusing adjustment module assembly 100, light streams from the reference object 502 and pass through the imaging lens 102A of the lens barrel assembly 102. The imaging lens 102A may be made of plastic or glass and may have a spherical or aspherical shape. The imaging lens 102A converges the incoming light from the reference object 502 and projects on the image sensor 106. In various embodiments, the image sensor 106 may be one of a CCD array, a CMOS array, or other such means. The image sensor 160 may be configured to detect the incoming light from the imaging lens 102A and generate an image electrical signal that corresponds to an image of the reference object 502.

Turning to operation 604, the image focusing adjustment module assembly 100 may include means, such as the image processing module 406, for analyzing the captured image of the reference object 502. In an embodiment, the image processing module 406 may be configured to analyze the image of the reference object 502, as further described in flowchart of FIG. 7.

Referring to FIG. 7, turning to operation 702, the image focusing adjustment module assembly 100 may include means, such as the image processing module 406, for determining a plurality of zones in the first image of the reference object 502 when the image focusing adjustment module 100 is operating in a first state. As described herein, the first state may be the initial state during the first iteration of the image focusing adjustment module assembly 100. After the first iteration, each time the image focusing adjustment module assembly 100 captures the image of the reference object 502 (for further analysis and corresponding adjustments), the image focusing adjustment module assembly 100 changes its state to a next state. During final iteration, when the image focusing adjustment module assembly 100 is suitably adjusted such that image characteristics satisfy the threshold values, the image focusing adjustment module assembly 100 is said to be in the final state.

In the example embodiment, as illustrated in block diagram 900 of FIG. 9, there is illustrated the image focusing adjustment module assembly 100 operating in the first state, depicted by $S_{First}$. While operating in the first state, depicted by $S_{First}$, the image focusing adjustment module assembly 100 captures a first instance 902 of the first image of the reference object 502. Once the first instance 902 of the first image of the reference object 502 is captured, the image processing module 406 may be configured to determine various zones, depicted by $Z_1$-$Z_6$, in the first instance 902 of the first image of the reference object 502. The image processing module 406 may further determine a central zone, depicted by $Z_C$, in the first instance 902 of the first image of the reference object 502. The image processing module 406 may be configured to determine the plurality of zones, depicted by $Z_1$-$Z_6$ and $Z_C$, based on one or more image segmentation algorithms retrieved from the memory 420.

Turning to operation 704, the image focusing adjustment module assembly 100 may include means, such as the image processing module 406, for determining image characteristics of the pattern for each of the plurality of zones in the image of the reference object 502. In an embodiment, as discussed in supra, the image processing module 406 may be configured to determine the image characteristics, such as one or more of the contrast level, the resolution level, the distortion level, the light uniformity level, or the color accuracy level of the pattern, such as a line pattern or a dot pattern, for each of the plurality of zones, depicted by $Z_1$-$Z_6$ and $Z_C$, in the image of the reference object 502.

In the example embodiment, as illustrated in the block diagram 900 of FIG. 9, in the first instance 902 of the first image of the reference object 502, the image processing module 406 may be configured to determine a contrast level of each of the plurality of zones, depicted by $Z_1$-$Z_6$ and $Z_C$, in the image of the reference object 502. For example, the image processing module 406 may execute a color contrast analyzer or a color contrast checker application based on, for example, Weber contrast, Michelson contrast or a root mean square (RMS) contrast, retrieved from the memory device 420, to determine contrast levels, defined by $C_{Z1}$-$C_{Z6}$ and $C_{ZC}$, of each of the plurality of zones, depicted by $Z_1$-$Z_6$ and $Z_C$, in the image of the reference object 502.

Turning to operation 706, the image focusing adjustment module assembly 100 may include means, such as the image processing module 406, for determining a cumulative value of image characteristics of the pattern in the first image based on an average of image characteristics of the pattern for the plurality of zones. In an embodiment, the image processing module 406 may be configured to determine a cumulative image characteristics, such as a cumulative value of contrast levels, a cumulative value of resolution levels, a cumulative value of distortion levels, a cumulative level of light uniformity levels, or a cumulative level of color accuracy levels of the pattern in the first instance 902 of the image of the reference object 502.

In an example embodiment, the image processing module 406 may be configured to determine the cumulative value of image characteristics based on an average of the image characteristics of the pattern for the plurality of zones, depicted by $Z_1$-$Z_6$, in the first image of the reference object 502. In another example embodiment, the image processing module 406 may be configured to determine the cumulative value of image characteristics based on one image characteristic of the pattern for the central zone, depicted by $Z_C$, in the first image of the reference object 502.

In the example embodiment, as illustrated in the block diagram 900 of FIG. 9 in the first instance 902 of the first image of the reference object 502, the image processing module 406 may determine a cumulative value of contrast levels, defined by $C_{Cumulative\text{-}value}$, based on the average of the contrast levels, defined by $C_{Z1}$-$C_{Z6}$, of the pattern for the plurality of zones, depicted by $Z_1$-$Z_6$, in the first instance 902 of the image of the reference object 502. Alternatively, the image processing module 406 may determine the cumulative value of contrast levels, defined by $C_{Cumulative\text{-}value}$, based on the contrast level, defined by $C_{ZC}$, of the pattern for the central zone, depicted by $Z_C$, in the first instance 902 of the image of the reference object 502. Control returns to operation 606 in FIG. 6.

Referring to FIG. 6, turning to operation 606, the image focusing adjustment module assembly 100 may include means, such as the image processing module 406, for determining whether the one or more image characteristics of the first image satisfies a threshold value. In an embodiment, the image processing module 406, may compare the determined cumulative value of image characteristics with a threshold value, retrieved from the memory device 420. The image processing module 406 may be further configured to determine whether the one or more image characteristics of the pattern for each of the plurality of zones in the image of the reference object 502 satisfies the threshold values. For example, the image processing module 406, may determine that the cumulative value of image characteristics, such as the cumulative value of contrast levels, defined by $C_{Cumulative\text{-}value}$, is less than the threshold value, defined by $C_{Threshold\text{-}value}$. The image processing module 406 may further determine that the one or more image characteristics, such as the contrast levels, defined by $C_{Z1}$-$C_{Z6}$, of the six zones, depicted by $Z_1$-$Z_6$, are fails to satisfy (i.e. less than) the threshold value. In such a case, the control turns to operation 608 in FIG. 6 (depicted as path N). In an alternate embodiment, the image processing module 406, may determine that the one or more image characteristics of the first image satisfies the threshold values. In such a case, the control turns to operation 612 in FIG. 6 (depicted as path Y).

Turning to operation 608, when the image processing module 406 determines that the one or more image characteristics of the first image fail to satisfy the threshold values, the image focusing adjustment module assembly 100 may include means, such as the control module 408 coupled to the image processing module 406, for controlling a plurality of adjustments to the image focusing adjustment module 100 operating in the first state through the plurality of actuators 410. The method for controlling a plurality of adjustments to the image focusing adjustment module 100 operating in the first state through the plurality of actuators 410 has been described in detail in FIG. 8.

Referring to FIG. 8, turning to operation 802, the image focusing adjustment module assembly 100 may include means, such as the plurality of actuators 410 controlled by the control module 408, for rotating the lens barrel assembly 102 relative to the neck member 108. The plurality of actuators 410, under the control of the control module 408, may be configured to rotate the lens barrel assembly 102 relative to the neck member 108 along a first axis, i.e. the Z-Axis 101. The rotation of the lens barrel assembly 102 causes a translational adjustment of the lens barrel assembly 102, along a first axis, i.e. the Z-Axis 101, relative to the neck member 108.

In an embodiment, when the outer surface of the lens barrel assembly 102 and the inner surface of the neck member 108 are helically threaded, the first actuator may be configured to rotate the lens barrel assembly 102 relative to the neck member 108 causing a translational adjustment of the lens barrel assembly 102, along a first axis, i.e. the Z-Axis 101, relative to the neck member 108. In an alternative embodiment, when the outer surface of the lens barrel assembly 102 and the inner surface of the neck member 108 are planar surfaces engaged with each other based on frictional fitting fastening mechanism, the first actuator may be configured to linearly move the lens barrel assembly 102 inwards or outwards relative to the neck member 108 causing a translational adjustment of the lens barrel assembly 102, along the first axis, i.e. the Z-Axis 101, relative to the neck member 108.

In the example embodiment, as illustrated in the block diagram 900 of FIG. 9, the first actuator of the plurality of actuators 410, under the control of the control module 408, may be configured to rotate the lens barrel assembly 102 relative to the neck member 108 along the first axis, i.e. the Z-Axis 101. The rotation of the lens barrel assembly 102 causes a translational adjustment of the lens barrel assembly 102 relative to the neck member 108. The control module 408, based on the analysis of the image processing module 406, may be configured to determine the degree of rotation or the extent of translational adjustment. While the lens barrel assembly 102 is rotated relative to the neck member 108 along the first axis, the image focusing adjustment module assembly 100 may be considered to operating in a first intermediate state, depicted by $S_1$.

Turning to operation 804, when the image focusing adjustment module assembly 100 is in the first intermediate state, depicted by $S_1$, the image processing module 406 may be configured to determine that the focus of the imaging lens 102A is at the central zone, such as $Z_C$, of the plurality of zones. In other words, the first actuator of the plurality of actuators 410, under the control of the control module 408, may be configured to rotate the lens barrel assembly 102 relative to the neck member 108 along the first axis. Accordingly, the focus of the imaging lens 102A is adjusted, such that the one or more image characteristics of the pattern in the first image for the central zone, depicted by $Z_C$, of the plurality of zones satisfies the threshold values. For example, the first actuator of the plurality of actuators 410, under the control of the control module 408, may be configured to rotate the lens barrel assembly 102 relative to the neck member 108 along the first axis, due to which, the focus of the imaging lens 102A is adjusted in such a manner that the contrast level, defined by $C_{ZC}$, of the central zone, depicted by $Z_C$, of the pattern in the first image satisfies (i.e. exceeds) the threshold values, defined by $C_{Threshold\text{-}value}$.

In the example embodiment, as illustrated in the block diagram 900 of FIG. 9, when the focus of the imaging lens 102A is adjusted in such a manner that the contrast level, defined by $C_{ZC}$, of the central zone, depicted by $Z_C$, of the pattern in the first image satisfies the threshold value, defined by $C_{Threshold\text{-}value}$, the first instance 902 of the first image of the reference object 502 may be transformed to a second instance 904 of the first image of the reference object 502. The second instance 904 of the first image may include the plurality of zones, depicted by $Z_1$-$Z_6$, such that the central zone, depicted by $Z_C$, is focused relative to the image focusing adjustment module assembly image focusing adjustment module assembly 100, thus not depicted in the second instance 904. However, the second instance 904 may include one or more zones, depicted by $Z_1$ and $Z_6$, having the corresponding one or more image characteristics of the pattern failing to satisfy the threshold values.

Turning to operation 806, the image focusing adjustment module assembly 100 may include means, such as the plurality of actuators 410 controlled by the control module 408, for rotating the neck member 108 relative to the top member 110. The plurality of actuators 410, under the control of the control module 408, may be configured to rotate the neck member 108 relative to the top member 110 around the first axis, i.e. the Z-Axis 101. The rotation of the neck member 108 causes a rotational adjustment of the neck member 108, around the first axis, i.e. the Z-Axis 101, relative to the top member 110. In an embodiment, the rotation of the neck member 108 relative to the top member 110 is through the sliding features 126.

In the example embodiment, as illustrated in the block diagram 900 of FIG. 9, a second actuator of the plurality of actuators 410, under the control of the control module 408, may be configured to rotate the neck member 108 relative to the top member 110 around the first axis, i.e. the Z-Axis 101. In an embodiment, the rotation may be a clockwise rotation. In another embodiment, the rotation may be an anticlockwise rotation. The rotation of the neck member 108 causes a rotational adjustment of the neck member 108 relative to the top member 110. The control module 408, based on the analysis of the image processing module 406, may be configured to determine the degree of rotation, as described in operation 808. While the neck member 108 is rotated relative to the top member 110 around the first axis, the image focusing adjustment module assembly 100 may be considered to operating in a second intermediate state, depicted by $S_2$.

Turning to operation 808, the image focusing adjustment module assembly 100 may include means, such as the image processing module 406, for determining one or more zones having corresponding one or more image characteristics of the pattern failing to satisfy the threshold value. Such one or more zones are reoriented along the third axis, i.e. the Y-Axis 105, during the rotational adjustment of the neck member 108 relative to the top member 110 around the first axis, i.e. the Z-Axis 101, as described in operation 806. The third axis is vertically orthogonal to the first axis, as illustrated in FIG. 1A.

In this operation, when the image focusing adjustment module assembly 100 is in the second intermediate state, depicted by $S_2$, the image processing module 406 may be configured to determine that one or more zones, such as $Z_1$ and $Z_6$, along the left vertical edge of the second instance 904 of the image, have corresponding one or more image characteristics of the pattern that fail to satisfy the threshold value. In other words, the second actuator of the plurality of actuators 410, under the control of the control module 408, may be configured to rotate the neck member 108 relative to the top member 110 around the first axis. Accordingly, the portions of the one or more zones, such as $Z_1$ and $Z_2$, are reoriented from the second axis, i.e. X-Axis 103, to the third axis, i.e. Y-Axis 105. Consequently, such portions of the one or more zones, such as $Z_1$ and $Z_6$, are realigned on the Y-Axis 105 that goes out of the FOV of the imaging lens 102A, as the X-Axis 103 is longer than the Y-Axis 105. Thus, in the reoriented first image, i.e. the third instance 906 of the first image, the newly aligned one or more zones, such as $Z_{1NEW}$ and $Z_{6NEW}$, have the corresponding image characteristics of the pattern satisfying the threshold values. For example, the second actuator of the plurality of actuators 410, under the control of the control module 408, may be configured to rotate the neck member 108 relative to the top member 110 around the first axis, and the zones are reset, depicted as $Z_{1NEW}$-$Z_{6NEW}$. Accordingly, contrast levels of the newly aligned one or more zones, defined by $C_{NewZ1}$ and $C_{NewZ6}$, of the pattern in the first image satisfy the threshold values, defined by $C_{Threshold\text{-}value}$.

In the example embodiment, as illustrated in the block diagram 900 of FIG. 9, when the orientation of the one or zones is adjusted in such a manner that the contrast level, defined by $C_{NewZ1}$ and $C_{NewZ6}$, of the newly aligned one or more zones, depicted by $Z_{1New}$ and $Z_{6New}$, of the pattern in the first image satisfy the threshold value, defined by $C_{Threshold-value}$, the second instance 904 of the first image of the reference object 502 may be transformed to the third instance 906 of the first image of the reference object 502. The third instance 906 of the first image may include the plurality of zones, depicted by $Z_{1NEW}$-$Z_{6NEW}$, such that the image characteristics of the one or more zones, depicted by $Z_{1New}$ and $Z_{6New}$, satisfy the threshold value, defined by $C_{Threshold-value}$. However, the third instance 906 may appear to be an unbalanced image along the third axis, i.e. the Y-Axis 105.

Turning to operation 810, the image focusing adjustment module assembly 100 may include means, such as the plurality of actuators 410 controlled by the control module 408, for positioning the tilt adjustment member 116 in the groove member 122. The positioning of the tilt adjustment member 116 fasten in or fasten out of the groove member 122 causes the tilt adjustment of the top member 110 relative to the frame member 112 along the second axis, i.e. the X-Axis 103.

In an embodiment, as illustrated in the top view of the frame member 112 in FIG. 3G, when the first rotation friction fitting tilt member 124 is positioned along the mid-Axis parallel to the first dimension of the frame member 112, the positioning of the tilt adjustment member 116 causes the tilt adjustment of the top member 110 relative to the frame member 112 along the second axis, i.e. the X-Axis 103. However, in an alternate embodiment, when the first rotation friction fitting tilt members 124 is positioned along the mid-Axis parallel to the second dimension of the frame member 112, the positioning of the tilt adjustment member 116 may cause the tilt adjustment of the top member 110 relative to the frame member 112 along the third axis, i.e. the Y-Axis 105.

In the example embodiment, as illustrated in the block diagram 900 of FIG. 9, a third actuator of the plurality of actuators 410, under the control of the control module 408, may be configured for positioning of the tilt adjustment member 116 to fasten in or fasten out of the groove member 122. The positioning of the tilt adjustment member 116 causes a tilt adjustment of the top member 110 relative to the frame member 112. The control module 408, based on the analysis of the image processing module 406, may be configured to determine the degree of tilt, as described in operation 812. While the top member 110 is tilted relative to the frame member 112 along the second axis, i.e. the X-Axis 103, the image focusing adjustment module assembly 100 may be considered to operating in a third intermediate state, depicted by $S_3$.

Turning to operation 812, the image focusing adjustment module assembly 100 may include means, such as the image processing module 406, for determining that the first image is balanced based on mutual comparison of one or more image characteristics of the pattern in the first image for a plurality of zones during the tilt adjustment of the top member 110 relative to the frame member 112 along the third axis, i.e. the Y-Axis 105. In other words, third actuator of the plurality of actuators 410, under the control of the control module 408, may be configured to position the tilt adjustment member 116 in such a manner to adjust the degree of tilt of the top member 110 relative to the frame member 112 along the third axis. Accordingly, the first image is balanced in such a manner that a symmetry of the pattern in the first image is equal for the plurality of zones, depicted by $Z_{1New}$-$Z_{6New}$.

In the example embodiment, as illustrated in the block diagram 900 of FIG. 9, when the tilt of the top member 110 is adjusted relative to the frame member 112 along the second axis, i.e. the X-Axis 103, in such a manner that the symmetry of the plurality of zones, depicted by $Z_{1New}$-$Z_{6New}$, of the pattern in the first image are equal to each other, the third instance 906 of the first image of the reference object 502 may be transformed to a fourth instance 908 of the first image of the reference object 502. The fourth instance 908 of the first image may include the plurality of zones, depicted by $Z_{1New}$-$Z_{6New}$, such that the each of the plurality of zones has corresponding image characteristics, such as the contrast level, the resolution level, the distortion level, the light uniformity level, or the color accuracy level, satisfying the threshold values, and the visual weight of each of the plurality of zones being symmetric. Accordingly, the image focusing adjustment module assembly 100 may be considered to operating in a final intermediate state, depicted by $S_{Final}$.

Turning to operation 814, the image focusing adjustment module assembly 100 may include means, such as the image processing module 406, for determining whether the image focusing adjustment module assembly 100 has reached its final state. In an embodiment, when the image focusing adjustment module assembly 100 is operating in a final intermediate state, depicted by $S_{Final}$, i.e. at the end of operation 812, the fourth instance 908 of the first image includes the plurality of zones, depicted by $Z_{1New}$-$Z_{6New}$, such that the each of the plurality of zones has corresponding image characteristics, such as the contrast level, the resolution level, the distortion level, the light uniformity level, or the color accuracy level satisfying the threshold values, and the visual weight of each of the plurality of zones being symmetric, the control returns to operation 612 in FIG. 6. In another embodiment, when the image focusing adjustment module assembly 100 is not operating in the final intermediate state, i.e. at the end of operation 812, the fourth instance 908 of the first image includes the plurality of zones, depicted by $Z_{1New}$-$Z_{6New}$, such that the each of the plurality of zones has corresponding image characteristics, such as the contrast level, the resolution level, the distortion level, the light uniformity level, or the color accuracy level fail to satisfy the threshold values, and the visual weight of each of the plurality of zones is asymmetric, control turns to operation 816.

Turning to operation 816, the image focusing adjustment module assembly 100 may include means, such as the feedback module 412, for generating a feedback signal based on the output image of the image focusing adjustment module assembly 100 in step 812. In an embodiment, feedback module 412 may be configured to communicate the generated feedback signal back to the image processing module 406 and/or the control module 408 to re-iterate the plurality of adjustments of the plurality of members of the image focusing adjustment module assembly 100 until the various image characteristics of the image of the reference object 502 satisfy the threshold values. The control returns back to operation 604 in FIG. 6.

According to various embodiments, the execution of the operations 604, 702-706, 606, 608, and 802-816 iterates until the one or more image characteristics, such as the contrast level, the resolution level, the distortion level, the light uniformity level, and/or the color accuracy level satisfy the threshold values. When the one or more image charac- teristics satisfy the threshold values and the visual characteristics of various zones become equal, the image focusing adjustment module assembly 100 may be declared to be operating in the final state.

Referring to FIG. 6, turning to operation 604, the image focusing adjustment module assembly 100 may include means, such as the image processing module 406, for again analyzing the image of the reference object 502 that is generated once the plurality of adjustments is performed through the plurality of actuators 410 by the image focusing adjustment module 100 operating in the first state. In an embodiment, the image processing module 406 may be configured to analyze the image, i.e. the fourth instance 908 of the image of the reference object 502, as further described in flowchart of FIG. 7 in the similar manner, as described above. Once the control returns from operation 706 of FIG. 7 to operation 604 in FIG. 6, the image processing module 406 may be again configured to determine whether the one or more image characteristics of the first image that fail to satisfy a threshold value, as described above in operation 606. Then the control passes to operation 608 and consecutively, the operations 802-816 are executed for the second iteration.

Turning to operation 612, when the one or more image characteristics satisfy the threshold values, the image focusing adjustment module assembly 100 may include means, such as the display module 404B, for displaying the final image captured by the imaging lens 102A operating in the final state. In an embodiment, the display module 404B displays the final image captured by the imaging lens 102A operating in the final state on a display screen positioned on the image focusing adjustment module assembly 100. In another embodiment, the display module 404B displays the final image captured by the imaging lens 102A operating in the final state on a display screen positioned on a remote device operated by the user for controlling the plurality of adjustments of the image focusing adjustment module assembly 100.

Turning to operation 614, the image focusing adjustment module assembly 100 may include means, such as the adhesive dispensing module 414, for dispensing a focusing locking adhesive between the lens barrel assembly 102 and the neck member 108, a rotating locking adhesive between the neck member 108 and the top member 110, and a tilting locking adhesive between the top member 110 and the frame member 112.

For example, the adhesive dispensing module 414 may dispense the focusing locking adhesive, depicted by $102_{Adh}$, between the lens barrel assembly 102 and the neck member 108, the rotating locking adhesive, depicted by $104_{Adh}$, between the neck member 108 and the top member 110, and the tilting locking adhesive, depicted by $116_{Adh}$, between the top member 110 and the frame member 112. The adhesive may be of a UV curable laminating adhesive composition that may be cured, solidified, or hardened only when exposed to a source of UV radiation with a pre-defined intensity and wavelength. Examples of such adhesives with UV curing technology may include, but are not limited to, UV Epoxy, UV Acrylic, UV Silicone, UV Cyanoacrylate, and UV Anaerobic.

Turning to operation 616, the image focusing adjustment module assembly 100 may include means, such as the adhesive curing module 416, for curing each of the focusing locking adhesive dispensed between the lens barrel assembly 102 and the neck member 108, the rotating locking adhesive dispensed between the neck member 108 and the top member 110, and the tilting locking adhesive dispensed between the top member 110 and the frame member 112 with UV light.

In an embodiment, the adhesive curing module 416 may be configured control a UV curing apparatus for curing the focusing locking adhesive $102_{Adh}$ dispensed between the lens barrel assembly 102 and the neck member 108, the rotating locking adhesive $104_{Adh}$ dispensed between the neck member 108 and the top member 110, and the tilting locking adhesive $116_{Adh}$ dispensed between the top member 110 and the frame member 112, based on various parameters. Examples of such parameters may include, but are not limited to, an intensity or quantity of UV light applied, time of application of the UV light, distance of application of the UV light to the adhesive, thickness of the adhesive, permeability of the substrate which must pass through the UV light, and the like. The control ends after operation 616.

In accordance with various embodiments disclosed herein, the implementation of 3-axis alignment provides a simple, easy and robust mechanism to perform a precise focusing camera module adjustment. The precise focusing camera module adjustment, per the systems, apparatuses, and methods described herein, in some examples, requires no thick floating adhesive, no adhesive curing shrinkage, and no thermal expansion related problems. The precise focusing camera module adjustment, per the systems, apparatuses, and methods described herein, in some examples, requires quite simple precision equipment. The adjustment and curing process is quick as compared to existing techniques. A minimal or no error die is observed corresponding to adhesive curing shrinkage, as the quantity used is very less. As the adhesive usage is very less, there is minimal thermal expansion mismatch that may introduce application temperature problems. Lesser number of adjustments makes the 3-axis focusing camera module adjustment approach economically reasonable. The floating adhesive based alignment is eliminated as 3-axis focusing camera module adjustment is converted to polar coordinate system with Z-axis translation, Z-axis rotation, and Y-axis tilting.

In some example embodiments, certain aspects of the operations herein may be modified or further amplified. Moreover, in an embodiment additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described about the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Alternatively, some steps or methods may be performed by circuitry that is specific to a given function.

Embodiments of the present disclosure have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, may be implemented by various means including computer program instructions. These computer program instructions may be loaded onto a general purpose computer, special purpose computer, or other programmable data processing apparatus discussed above with reference to FIG. 1, to produce a machine, such that the computer program product includes the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

In one or more aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure(s) set out in any claims that may issue from this disclosure. For instance, a description of a technology in the "Background" is not to be construed as an admission that certain technology is prior art to any disclosure(s) in this disclosure. Neither is the "Summary" to be considered as a limiting characterization of the disclosure(s) set forth in issued claims. Furthermore, any reference in this disclosure to "disclosure" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other objects shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosures are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for image focusing adjustment, the method including:
    receiving, by an image processing module, a first image of a reference object in response to an input signal, wherein the first image is captured by an imaging lens within a lens barrel assembly of an image focusing adjustment module that is operating in a first state;
    analyzing, by the image processing module, the captured first image of the reference object; and
    controlling, by a control module coupled to the image processing module, a plurality of adjustments, through a plurality of actuators, to the image focusing adjustment module operating in the first state based on the analysis of the captured first image, wherein the plurality of adjustments include:
        rotating, by the plurality of actuators controlled by the control module, the lens barrel assembly relative to a neck member along a first axis that causes a translational adjustment of the lens barrel assembly;
        rotating, by the plurality of actuators controlled by the control module, the neck member relative to a top member around the first axis that causes a rotational adjustment of the lens barrel assembly; and
        positioning, by the plurality of actuators controlled by the control module, a tilt adjustment member that causes tilt adjustment of the top member relative to a frame member along a second axis.

2. The method according to claim 1, further including communicating, by a feedback module coupled to the image processing module, a feedback signal to the control module based on an analysis of a second image that is generated by the imaging lens of the image focusing adjustment module operating in a second state, wherein the image focusing adjustment module operates in the second state when the plurality of adjustments is performed on the image focusing adjustment module operating in the first state.

3. The method according to claim 1, further including displaying, by a display module, one of the first image or an output image that is captured by the imaging lens in the lens barrel assembly of the image focusing adjustment module operating in one of the first state or a second state, respectively.

4. The method according to claim 1, wherein the reference object is a monochrome or a colored test chart, wherein the reference object includes specified patterns over a field of view (FOV) of the imaging lens, wherein one or more image characteristics of the specified patterns in a plurality of zones in an image of the reference object captured by the imaging lens indicates an image quality of the image.

5. The method according to claim 1, further including:
    determining, by the image processing module, a plurality of zones in the first image of the reference object when the image focusing adjustment module is operating in the first state;
    determining, by the image processing module, a first image characteristics of a pattern for each of the plurality of zones in the first image;
    determining, by the image processing module, a first cumulative image characteristics of the pattern in the first image based on an average of the first image characteristics of the pattern for the plurality of zones; and
    comparing, by the image processing module, the first cumulative image characteristics of the pattern in the first image for the plurality of zones with a threshold value,
        wherein, in an instance in which the first cumulative image characteristics of the pattern fails to satisfy the threshold value, the image processing module may be configured to send a first feedback signal to the image processing module for the adjustment of the image focusing adjustment module operating in the first state to operating in a second state, and
        wherein, in an instance in which the first cumulative image characteristics of the pattern satisfy the threshold value, the image processing module may be configured to send a final signal for designating the first state of the image focusing adjustment module as a final state.

6. The method according to claim 1, further including determining, by the image processing module, a focus of the imaging lens at a central zone of a plurality of zones, wherein the focus of the imaging lens is adjusted based on a comparison of image characteristics of a pattern in the first image or a second image for the central zone of the plurality of zones with threshold values during the translational adjustment of the lens barrel assembly relative to the neck member along the first axis.

7. The method according to claim 1, further including determining, by the image processing module, one or more zones having corresponding image characteristics of a pattern failing to satisfy threshold values, wherein the one or more zones are reoriented along a third axis during the rotational adjustment of the neck member relative to the top member around the first axis, wherein the third axis is vertically orthogonal to the first axis.

8. The method according to claim 1, further including determining, by the image processing module, that the first image or a second image are balanced based on a mutual comparison of image characteristics of a pattern in the first image or the second image for a plurality of zones during the tilt adjustment of the top member relative to the frame member along the second axis.

9. The method according to claim 1, further including causing dispensing, by an adhesive dispensing module, a focusing locking adhesive between the lens barrel assembly and the neck member, a rotating locking adhesive between the neck member and the top member, and a tilting locking adhesive between the top member and the frame member.

10. The method according to claim 9, further including curing, by an adhesive curing module, each of the focusing locking adhesive dispensed between the lens barrel assembly and the neck member, the rotating locking adhesive dispensed between the neck member and the top member, and the tilting locking adhesive dispensed between the top member and the frame member with ultraviolet (UV) light.

11. The method according to claim 1, wherein the input signal corresponds to an actuation of a hardware button press event, a software button press event, a provision of a voice command or a gesture input.

12. A system for image focusing adjustment, the system comprising:
an image processing module communicatively coupled to a plurality of actuators;
an image focusing adjustment module including:
an imaging lens in a lens barrel assembly of the image focusing adjustment module operating in a first state, wherein the imaging lens is configured to capture a first image of a reference object; and
a control module configured to control the plurality of actuators based on an analysis of the first image output by the image processing module,
wherein, to adjust the image focusing adjustment module operating in the first state to operating in a second state, the plurality of actuators, controlled by the control module, is configured to:
rotate the lens barrel assembly relative to a neck member along a first axis that causes a translational adjustment of the lens barrel assembly; and
rotate the neck member relative to a top member around the first axis that causes a rotational adjustment of the lens barrel assembly.

13. The system according to claim 12, wherein the plurality of actuators, controlled by the control module, is further configured to position a tilt adjustment member that causes tilt adjustment of the top member relative to a frame member along a second axis.

14. The system according to claim 12, further includes a feedback module configured to communicate a feedback signal to the control module based on an analysis of a second image generated by the imaging lens of the image focusing adjustment module operating in the second state, wherein the image focusing adjustment module operates in the second state when a plurality of adjustments is performed on the image focusing adjustment module operating in the first state.

15. The system according to claim 12, further includes a display module configured to display the first image and/or a second image that is captured by the imaging lens in the lens barrel assembly of the image focusing adjustment module operating in the first state and/or the second state.

16. The system according to claim 12, wherein, for the analysis of the first image, the image processing module is configured to:
determine a plurality of zones in the first image of the reference object when the image focusing adjustment module is operating in the first state;
determine a first image characteristics of a pattern for each of the plurality of zones in the first image;
determine a first cumulative image characteristics of the pattern in the first image based on an average of the first image characteristics of the pattern for the plurality of zones; and
compare the first cumulative image characteristics of the pattern in the first image for the plurality of zones with threshold values,
wherein, in an instance in which the first cumulative image characteristics of the pattern fail to satisfy the threshold values, the image processing module may be configured to send a first feedback signal to the control module for an adjustment of the image focusing adjustment module operating in the first state to operating in the second state, and
wherein, in an instance in which the first cumulative image characteristics of the pattern satisfy the threshold values, the image processing module may be configured to send a final signal to the control module for designating the first state of the image focusing adjustment module as a final state.

17. The system according to claim 12, wherein the image processing module is further configured to determine that a focus of the imaging lens at a central zone of a plurality of zones is adjusted based on a comparison of image characteristics of a pattern in the first image or a second image for the central zone of the plurality of zones with threshold values during the translational adjustment of the lens barrel assembly relative to the neck member along the first axis.

18. The system according to claim 12, wherein the image processing module is further configured to determine that one or more zones having corresponding image characteristics of a pattern failing to satisfy threshold values, wherein the one or more zones are reoriented along a third axis, during the rotational adjustment of the neck member relative to the top member around the first axis.

19. The system according to claim 12, wherein the image processing module is further configured to determine that the first image or a second image is balanced based on comparison of one or more image characteristics of a pattern in the first image or the second image for a plurality of zones with threshold values during a tilt adjustment of the top member relative to a frame member along a second axis.

20. The system according to claim 12, further including an adhesive dispensing module configured to cause dispensing of a focusing locking adhesive between the lens barrel assembly and the neck member, a rotating locking adhesive between the neck member and the top member, and a tilting locking adhesive between the top member and a frame member.

21. The system according to claim 20, further including an adhesive curing module configured to cure the dispensed focusing locking adhesive, the rotating locking adhesive, and the tilting locking adhesive once the lens barrel assembly is adjusted relative to the neck member, the neck member is adjusted relative to the top member, and the top member is adjusted relative to the frame member.

22. An image focusing adjustment method including:
causing an imaging lens in a lens barrel assembly of an image focusing adjustment module operating in a current state to capture a first image of a reference object in response to an input signal, wherein the first image includes a plurality of zones;
causing a display screen to display the captured first image, a current cumulative image characteristics of a pattern in the first image for the plurality of zones, and one or more boundaries enclosing one or more zones with current image characteristics of the pattern of a current image failing to satisfy threshold values;

causing a plurality of adjustments to the image focusing adjustment module operating in the current state such that the image focusing adjustment module is adjusted operating in the current state to operating in a next state for each of one or more zones until the current image characteristics of the one or more zones in the current image satisfy the threshold values, wherein the plurality of adjustments including:

causing the lens barrel assembly to rotate relative to a neck member along a first axis for a translational adjustment of the lens barrel assembly;

causing a neck member to rotate relative to a top member around the first axis for a rotational adjustment of the lens barrel assembly; and causing a tilt adjustment member to position in the top member for a tilt adjustment of the top member relative to a frame member along a second axis.

23. The image focusing adjustment method according to claim 22, wherein the causing of the plurality of adjustments is due to an external force imparted for providing one or more of the input signal and the plurality of adjustments.

24. The image focusing adjustment method according to claim 22, wherein in an instance when the current image characteristics of the one or more zones satisfy threshold values, the image focusing adjustment module is fixed in a final state by an adhesive dispensing module that causes dispensing of adhesive between the lens barrel assembly and the neck member, the neck member and the top member, and the top member and the frame member.

25. The image focusing adjustment method according to claim 24, wherein the dispensed adhesive between the lens barrel assembly and the neck member, the neck member and the top member, and the top member and the frame member is cured with ultraviolet (UV) light to secure the image focusing adjustment module operating in the final state.

26. An image focusing adjustment module including:
an imaging lens disposed in a lens barrel assembly;
a focusing holder member movably engaging the lens barrel assembly from a holder top end and securing an image sensor at a holder bottom end, the focusing holder member including:
  a neck member slidably engaged with the lens barrel assembly through fitting features that define a translational motion of the lens barrel assembly relative to the neck member along a first axis, wherein a first axis longitudinally coincides with an optical axis of the lens barrel assembly;
  a top member secured with the neck member through slide locking features that define a rotational motion of the neck member relative to the top member around the first axis;
  a frame member tiltably engaged with the top member through a second rotational friction fitting members located at a frame bottom end of the frame member; and
a tilt adjustment member, positioned in the top member, that defines a tilting of the top member relative to the frame member along a second axis, wherein the second axis is orthogonally horizontal to the first axis.

27. The image focusing adjustment module according to claim 26, wherein the top member tiltably engages with the frame member through at least one of a set of snap-in features and a first rotational friction fitting members, which correspond to the fitting features.

28. The image focusing adjustment module according to claim 26, wherein a cover member of the top member is secured within the frame member through a set of snap-in features.

29. The image focusing adjustment module according to claim 26, wherein the first axis corresponds to a roll axis and the second axis corresponds to a pitch axis.

* * * * *